(12) United States Patent
Smyth et al.

(10) Patent No.: US 11,613,090 B1
(45) Date of Patent: Mar. 28, 2023

(54) LENS CASTING WITH DEFORMABLE MOLDS

(71) Applicant: META PLATFORMS TECHNOLOGIES, LLC, Menlo Park, CA (US)

(72) Inventors: Katherine Marie Smyth, Seattle, WA (US); John Cooke, Bothell, WA (US); Robin Sharma, Redmond, WA (US); Andrew John Ouderkirk, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 72 days.

(21) Appl. No.: 16/774,008

(22) Filed: Jan. 28, 2020

Related U.S. Application Data

(60) Provisional application No. 62/942,271, filed on Dec. 2, 2019.

(51) Int. Cl.
*B29D 11/00* (2006.01)

(52) U.S. Cl.
CPC .... *B29D 11/00557* (2013.01); *B29D 11/0048* (2013.01); *B29D 11/0099* (2013.01); *B29D 11/00442* (2013.01); *B29D 11/00865* (2013.01); *B29D 11/00951* (2013.01)

(58) Field of Classification Search
CPC .......... B29D 11/00557; B29D 11/0099; B29D 11/00865; B29D 11/00951; B29D 11/0048; B29D 11/00442
See application file for complete search history.

(56) References Cited

U.S. PATENT DOCUMENTS

| | | | | |
|---|---|---|---|---|
| 3,251,908 A * | 5/1966 | Wilenius | ................. | B29C 39/26 425/173 |
| 5,028,358 A * | 7/1991 | Blum | .................. | B29C 35/0888 264/1.32 |
| 6,830,712 B1 * | 12/2004 | Roffman | .......... | B29D 11/00125 249/82 |
| 7,264,755 B2 * | 9/2007 | Griffith | ............... | B29C 33/0011 264/1.1 |
| 2005/0269721 A1 * | 12/2005 | Adileh | .............. | B29C 66/81455 264/1.32 |
| 2017/0219848 A1 * | 8/2017 | Kraus | ................. | G02B 27/0012 |
| 2017/0355117 A1 * | 12/2017 | Most | ....................... | B29C 70/48 |

OTHER PUBLICATIONS

Luxexcel, "Luxexcel—3D Printed Optics", URL: https://www.luxexcel.com/, as accessed on Jul. 1, 2019, pp. 1-6.
Jenoptik, "Mirror Coating for Polymer Optics", URL: https://www.jenoptik.com/products/optical-systems/optical-precision-components/polymer-optics/mirror-coating, as accessed on Jul. 1, 2019, pp. 1-5.

(Continued)

*Primary Examiner* — Mathieu D Vargot
(74) *Attorney, Agent, or Firm* — Greenberg Traurig, LLP

(57) ABSTRACT

A casting method involves providing a precursor to a mold that includes a deformable surface overlying a chamber, shaping the deformable surface according to a surface profile by adjusting a fluid pressure within the chamber and driving one or more actuators that are configured to distort the deformable surface, and solidifying the precursor while the deformable surface is shaped according to the surface profile to form an optical element.

20 Claims, 15 Drawing Sheets

(56) References Cited

OTHER PUBLICATIONS

Zeiss, "How are eyeglass lenses manufactured?", URL: https://www.zeiss.com/vision-care/us/better-vision/understanding-vision/how-are-eyeglass-lenses-manufactured.html, as accessed on Jul. 1, 2019, pp. 1-20.
Liebetraut et al., "Elastomeric lenses with tunable astigmatism", Light: Science & Applications, vol. 2, No. 9, e98, 2013, pp. 1-6.

* cited by examiner

*A*

*B*

LENS CASTING WITH DEFORMABLE MOLDS

CROSS-REFERENCE TO RELATED APPLICATION

This application claims the benefit of priority under 35 U.S.C. § 119(e) of U.S. Provisional Application No. 62/942,271, filed Dec. 2, 2019, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
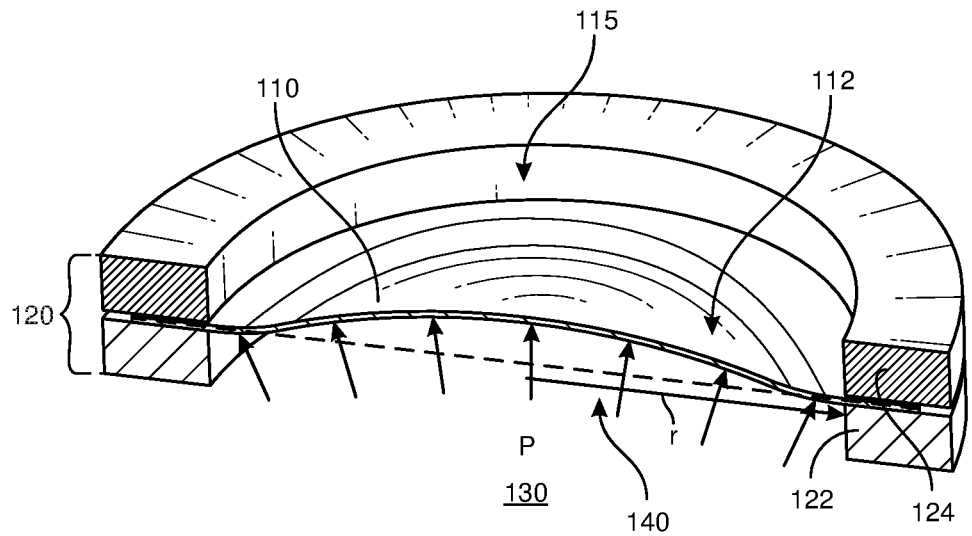
FIG. 1 is a schematic isometric view showing the pressure-induced distortion of a deformable membrane according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The fabrication of prescriptive lenses typically involves a casting process to generate a lens blank followed by milling or grinding and polishing to introduce customized, higher order curvature to at least one lens surface. Post-machining and its subtractive nature, however, may introduce added cost and complexity to the manufacturing process. Inefficient production is especially an issue in ophthalmic lenses, where nearly 80% of the starting material may be lost to subtractive manufacture. Notwithstanding recent developments, it would be advantageous to provide cost-effective systems and methods for the manufacture of high-quality prescriptive lenses and other optical elements, particularly lenses for augmented reality and virtual reality applications, where corrective lenses having a slim form factor are desired.

The present disclosure relates generally to directly cast optics having symmetric or asymmetric surface profiles, which may be applied to prescription lenses having both spherical (or aspherical) and cylindrical correction, and more specifically to apparatus, systems, and methods for casting parts such as prescription lenses and other optical elements using deformable molds. In certain aspects, a surface profile may include at least one of spherical, aspherical, and cylindrical geometries. As used herein, "at least one of spherical, aspherical, and cylindrical" should be understood to mean any combination thereof, i.e., only spherical, only aspherical, only cylindrical, spherical and aspherical, spherical and cylindrical, aspherical and cylindrical, or spherical, aspherical, and cylindrical.

In accordance with various embodiments, a lens-forming liquid (e.g., a curable liquid such as a resin) may be provided to a mold that has at least one deformable surface. A fluid-filled chamber and actuators that are coupled to the deformable surface of the mold can be driven according to a selected surface profile that corresponds to a user's prescription so that when the lens-forming liquid is solidified, the resulting optical element includes the user's prescription. The ability to controllably and independently introduce symmetric surface profiles through pressure applied by the fluid-filled chamber and asymmetric surface profiles through actuator-driven edge modification of the deformable surface may be used to modify higher order Zernike polynomials to correct for aberrations in the optical element for applications including, but not limited to, prescription lenses, polymer mirrors, and the like.

As will be appreciated, although various embodiments disclosed herein are described in the context of an organic lens-forming liquid such as a curable resin, other lens-forming materials, i.e., precursors, may be used. For instance, an inorganic lens-forming material may include various low melting temperature glass compositions. A "low melting temperature" glass may, in some examples, be characterized by a glass transition temperature ($T_g$) of approximately 550° C. or less and/or a softening temperature ($T_s$) of approximately 600° C. or less. Suitable glass compositions may include various low melting temperature glass compositions such as $SiO_2$—$B_2O_3$—$Li_2O$—$BaO$-based glasses, although other glass compositions are contemplated.

As used herein, reference to a "deformable surface" may, in some examples, include a structural element having lateral dimensions that are much greater than its thickness. In examples where bending is determined by stiffness, the deformable surface may also be referred to as a plate, whereas in examples where the deformable surface is pre-tensioned or where bending is determined by tension, the deformable surface may also be referred to as a membrane. In a deformed state, the deformable surface may behave as a plate, as a membrane, or as a combination of a plate and a membrane.

Elements of the presently-disclosed casting apparatus including the deformable plate or membrane may be, in certain embodiments, sufficiently transparent to allow radiation, e.g., UV radiation, to propagate therethrough to a curable liquid to activate or accelerate curing of the curable liquid. As used herein, a material or element that is "transparent" or "optically transparent" may, for example, have a transmissivity across a selected spectrum of electromagnetic radiation, e.g., UV radiation, of at least approximately 80%, e.g., 80, 85, 90, 95, 97, 98, 99, or 99.5%, including ranges between any of the foregoing values, and less than approximately 10% bulk haze, e.g., 0, 1, 2, 5, or 10% bulk haze, including ranges between any of the foregoing values. Curing of the curable liquid may also be activated or accelerated by heat.

In some embodiments, a closed-loop system may independently regulate pressure within the fluid-filled chamber and adjust the actuators that collectively control the shape of the deformable surface based on imaging the deformable surface directly or indirectly by light reflecting off or passing through the deformable surface. For example, the deformable surface may be illuminated with illumination light (e.g., infrared light). A Shack-Hartmann type wavefront sensor (including a lenslet array and a camera) may receive the reflection of the illumination light from the deformable surface. Image data captured from the camera may be analyzed for both the intensity and the positions of the focused beams to characterize the shape of the deformable surface. The image data may be compared to calibration data associated with a selected surface profile representing the design intent. Based on that comparison, the fluid-filled chamber and the actuator(s) coupled to the deformable surface may be adjusted.

As will be appreciated, whereas a comparative lens blank, e.g., for an ophthalmic lens, may be molded to have a desired spherical correction and then post-machined to introduce a cylindrical correction, the presently-disclosed process and apparatus may be used to form a lens blank having both spherical correction and cylindrical correction along a particular axis in a single molding step.

A casting method involves providing a liquid to a mold that includes a deformable surface overlying a chamber, shaping the deformable surface according to a surface profile by adjusting a fluid pressure within the chamber and driving one or more actuators that are configured to distort the deformable surface, and solidifying the liquid while the deformable surface is shaped according to the surface profile to form an optical element.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-16, detailed descriptions of casting apparatus and methods for forming optical elements such as prescriptive lenses. The discussion associated with FIGS. 1-14 relates to deformable molds and the independent control of (a) pressure within a fluid-filled chamber of a casting assembly to create axisymmetric deflections in a deformable surface of the mold, and (b) edge corrections to create asymmetric deflections in the deformable surface for forming optical elements. The discussion associated with FIGS. 15 and 16 relates to exemplary virtual reality and augmented reality devices that may include an optical element as disclosed herein.

According to various embodiments, a pressurizable fluid-filled chamber and separate edge actuators each located proximate to the deformable surface of a casting assembly may be independently controlled to decouple symmetric and asymmetric contributions to the profile of the deformable surface of a mold. For a circular aperture, for example, a change in the pressure applied uniformly over a membrane that is constrained along its periphery results in axisymmetric deformation of the surface (i.e., a deformable surface) of the membrane, which is shown schematically in FIG. 1, where a pressure P is applied to a membrane 110 peripherally mounted within the aperture 115 of frame 120 between a lower frame member 122 and an upper frame member 124 by pumping fluid 130 into or out of chamber 140. Pumping of the fluid 130 may be electrically controlled, for example. The axisymmetric deformation of the membrane 110 may be characterized by a maximum deflection at or about a centerpoint of the membrane 110 with respect to the peripheral frame 120 with the magnitude of the deflection decreasing with increasing radius (r). In some embodiments, axisymmetric deformation of the membrane 110 may include spherical or aspherical geometries.

The membrane (or plate) 110 having a deformable surface 112 may include a transparent polymer, such as an elastomer, or a more rigid material such as sapphire, glass, or a ceramic. Relative to polymer materials, example rigid materials may exhibit better mechanical stability during exposure to heat and/or radiation (e.g., during the act of curing a curable liquid cast over the deformable surface), as well as better chemical compatibility with the lens-forming liquid. For less rigid materials such as elastomers, on the other hand, pre-tension may be applied to the membrane to decrease wrinkling effects and, as disclosed herein, enable a more ideal spherical profile over a larger area of the aperture.

As will be appreciated, the shape of the axisymmetric deformation profile may depend on the contribution of pre-tension to the membrane 110. In the absence of applied tension, deflection is predicted by the material stiffness and scales roughly as $(r/a)^4$, where r is the radial coordinate in a cylindrical coordinate system and a is the radius of the membrane. If pre-tension is applied, membrane contributions that increase with the level of applied pre-tension may contribute to the deflection behavior, which scales as $(r/a)^2$. For spherical optics, the parabolic scaling of membrane deflection may more closely match the ideal spherical profile over the full aperture. However, in some embodiments, the optic (e.g., lens) may be cast over the full aperture where only a center portion that more ideally matches the desired spherical profile is used while the perimeter material may be discarded in post-processing.

Figure 2:
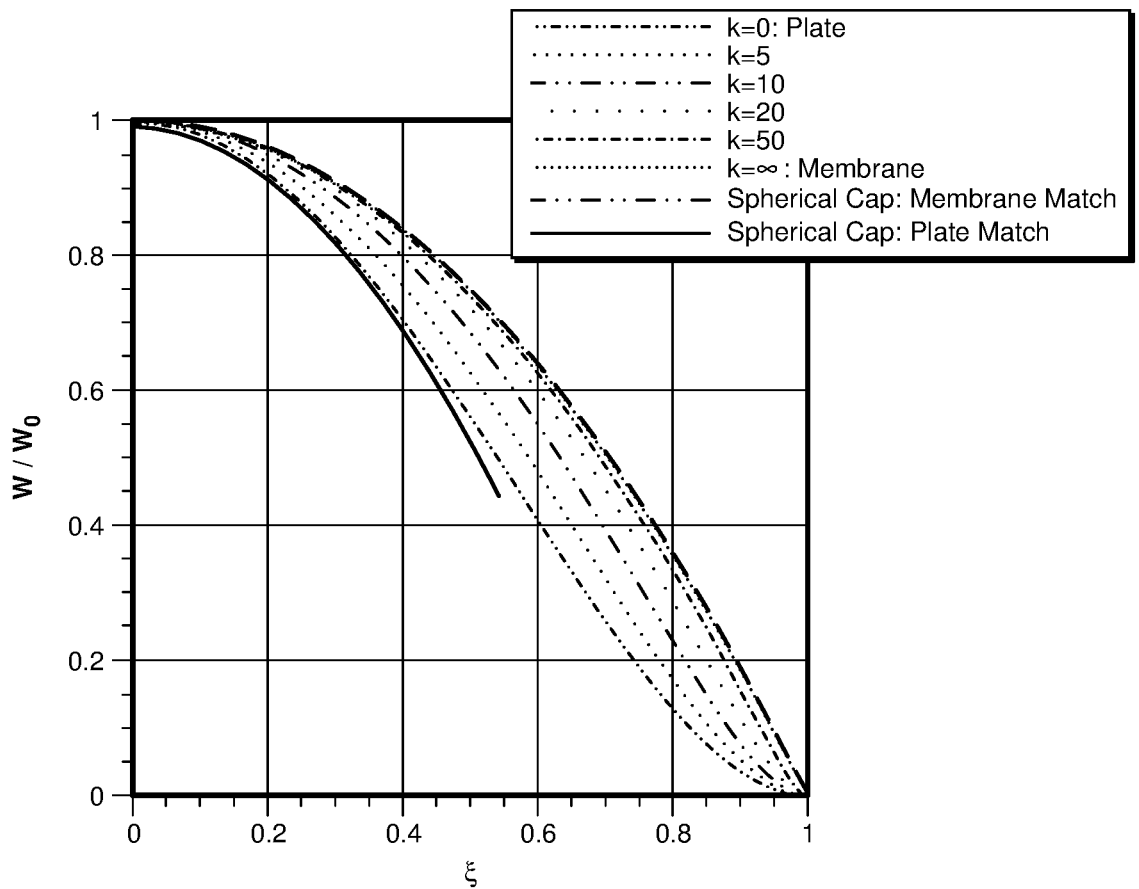
FIG. 2 is a plot of normalized deflection as a function of a non-dimensionalized aperture radius showing the pressure-induced distortion of a deformable membrane according to certain embodiments.

A plot of normalized deflection as a function of non-dimensionalized radius of the aperture is shown in FIG. 2. Spherical profiles are shown to nearly match the deflection over the full aperture for pure membrane deflection ($k=\infty$), whereas agreement is good for a smaller portion of the aperture radius for pure plate deflection ($k=0$). It can be assumed that with varying levels of pre-tension that the usable area will also vary between the minimum plate and maximum membrane aperture sizes. With reference to the data in FIG. 2, in some embodiments, the casting assembly may be over-dimensioned to account for peripheral material that may not fall within a specified spherical profile. In FIG. 2, the variable k is a non-dimensionalized variable that reflects the contribution of tension compared to plate stiffness.

As shown in FIGS. 1 and 2, axisymmetric deformation may be created by controlling the pressure within a fluid-filled chamber covered by a membrane or plate. Asymmetric deflections, on the other hand, which may be associated with cylindrical corrections, may be added to the profile of the deformable surface through modifications of the membrane or plate edge. A finite element-based approach for determining a desired amount of edge deformation is illustrated in FIG. 3.

With reference to FIG. 3A, a desired amount of edge deflection may be determined from the "ideal" optical surface 310 of a prescription lens having spherical and cylindrical correction. As shown in FIG. 3B, the ideal optical surface may be plotted over the full aperture of the membrane allowing mapping of the edge deformation condition 312, which may be discretized 314 as shown in FIG. 3C to match points or regions mapped to specific actuators or actuation mechanisms.

Figure 3:
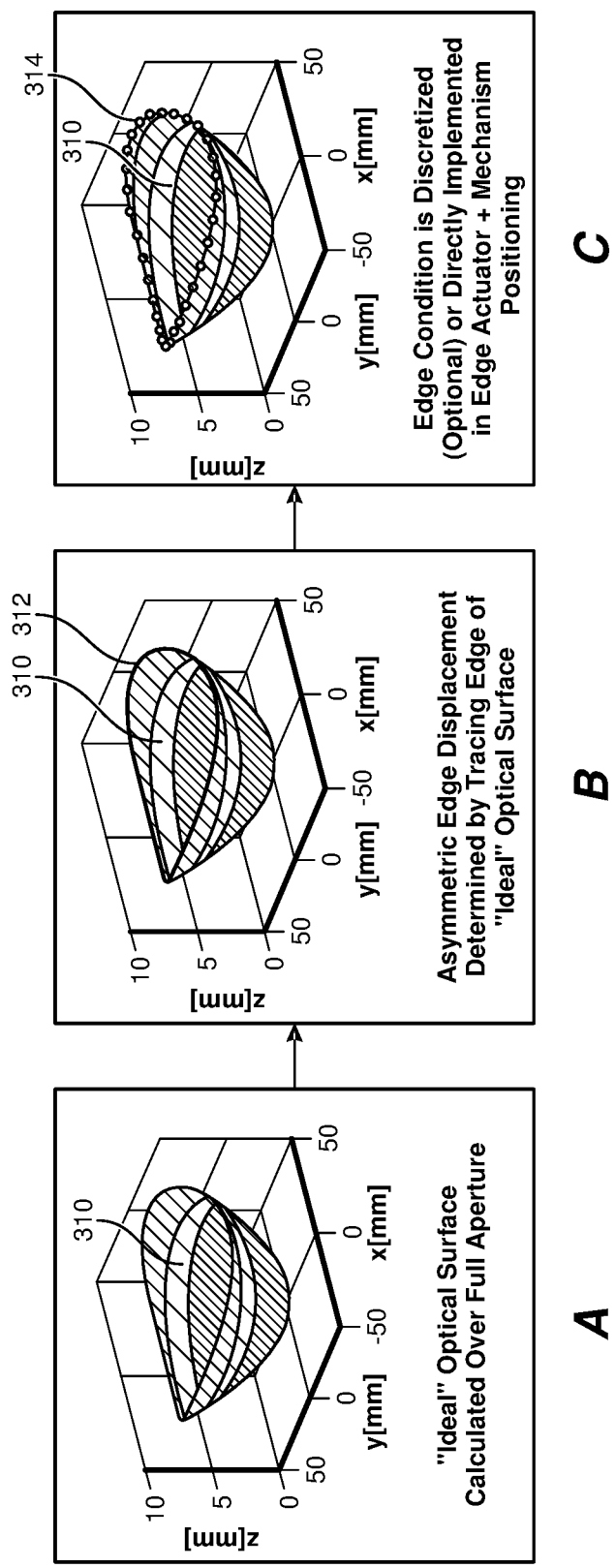
FIG. 3 illustrates a process for creating an idealized optical surface using an asymmetric edge deflection according to some embodiments.
Figure 4:
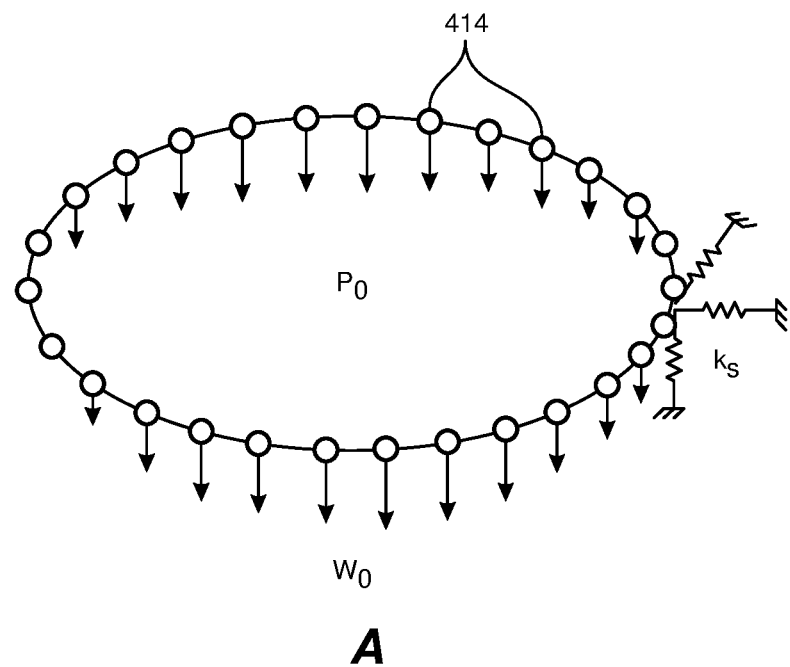
FIG. 4 shows the application of pressure and edge deflection to a deformable surface and a profile of the resulting deformed surface according to certain embodiments.
Figure 4:
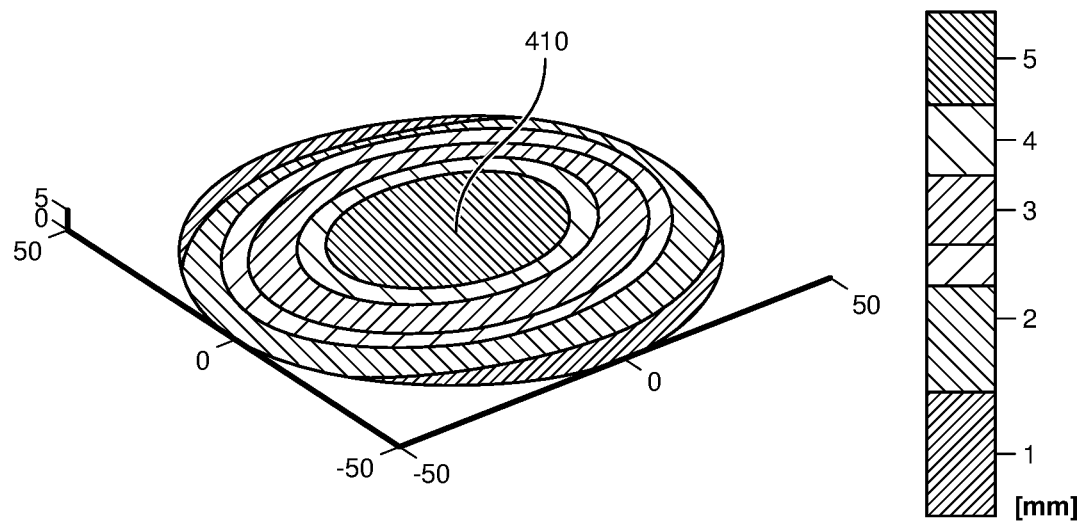
Figure 5:
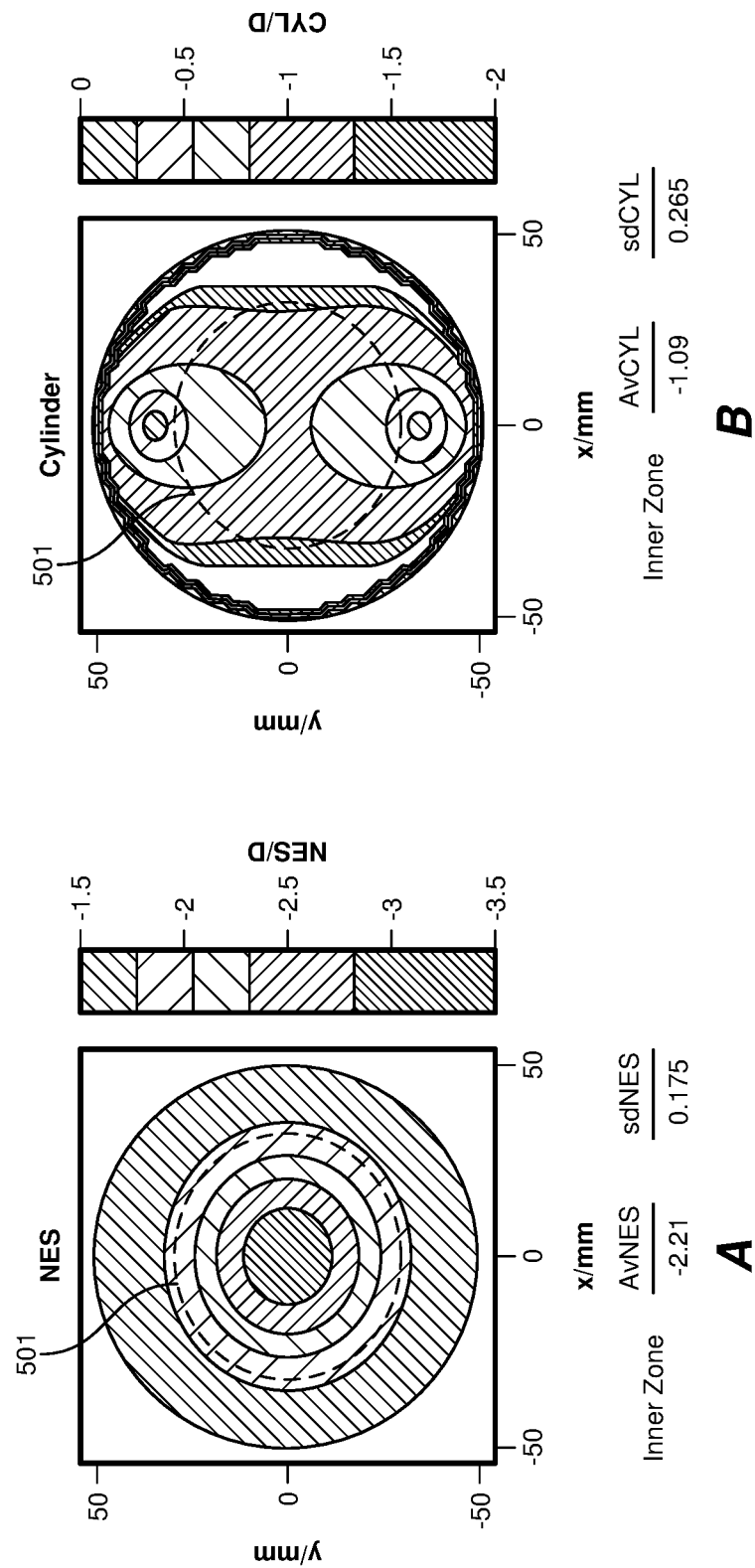
FIG. 5 shows an optical analysis of a deformed surface generated by a pressure-induced distortion and an asymmetric edge deflection according to some embodiments.
Figure 6:
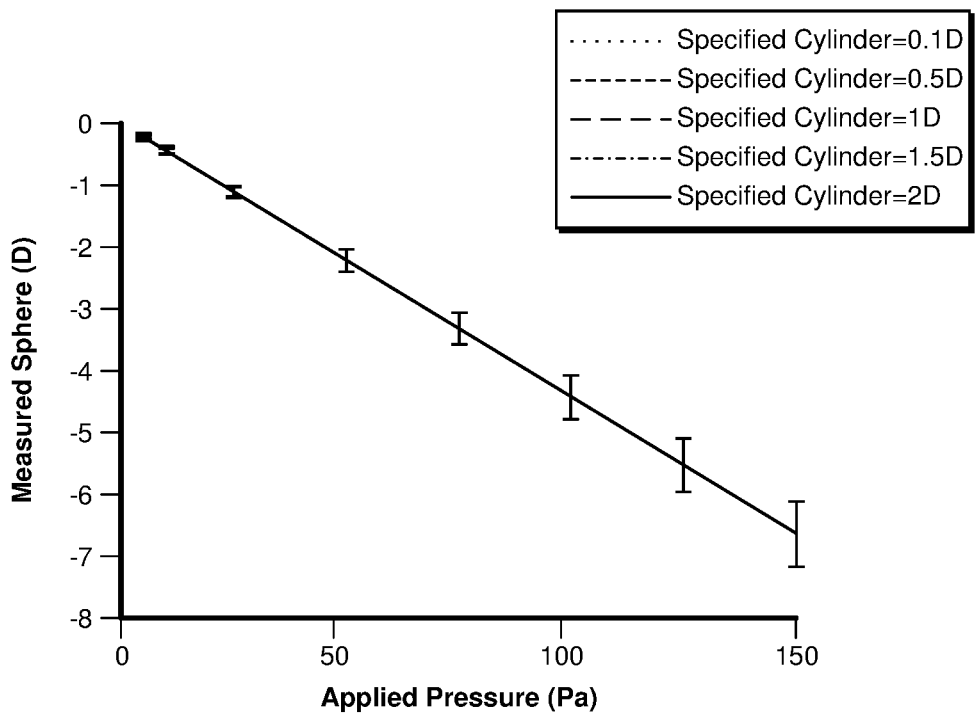
FIG. 6 shows companion plots illustrating the combination of applied pressure and the discretization of an ideal cylinder edge condition to separately and controllably introduce spherical and cylindrical distortions to a lens casting method according to certain embodiments.
Figure 6:
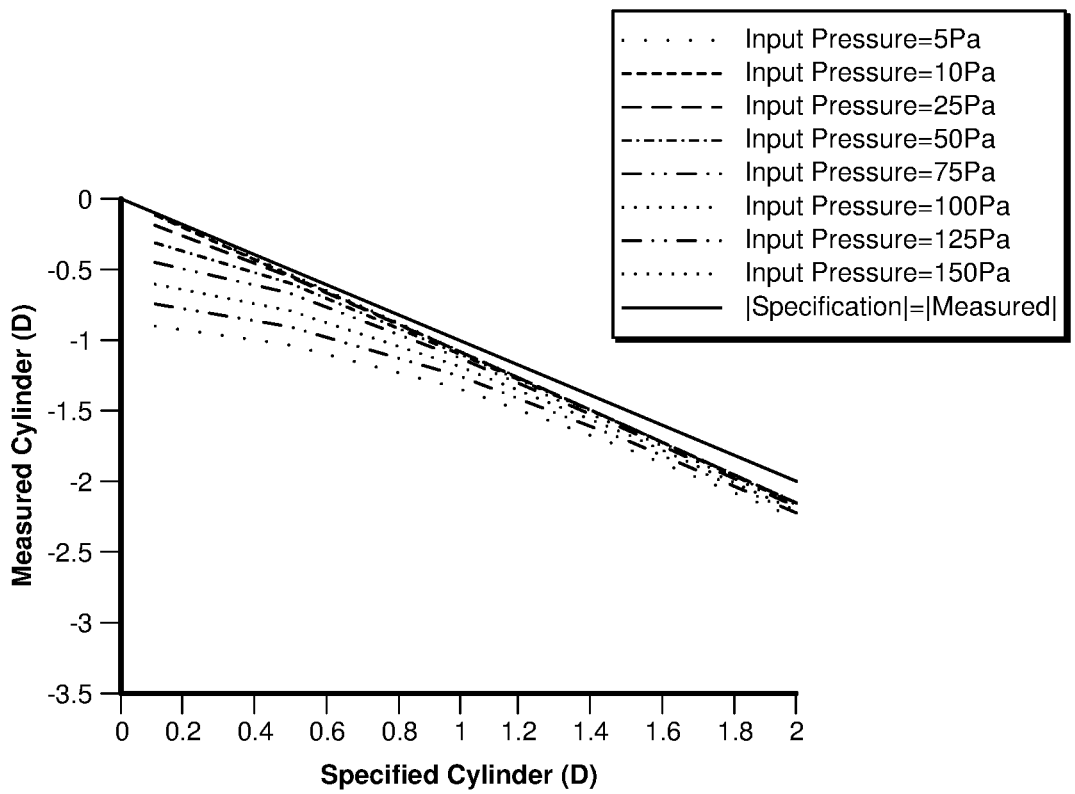

Using the data from FIG. 3, referring now to FIG. 4, a deflection ($w_0$) applied to the designated edge positions 414 (i.e., discretized edge positions 314) can be coupled with an applied pressure ($P_0$) as shown in FIG. 4A to produce the deformed mold surface 410 shown in FIG. 4B having both spherical and cylindrical components. Referring to FIG. 5, an optical analysis of the deformed surface 410 having spherical power (NES) and cylindrical deformation (Cylinder) components is shown in FIG. 5A and FIG. 5B, respectively. For the illustrated example, in FIG. 5A, the average spherical power and corresponding standard deviation along inner zone 501 of the deformable surface are annotated AvNES and sdNES, while in FIG. 5B, the average cylindrical deformation and corresponding standard deviation along inner zone 501 of the deformable surface are annotated AvCYL and sdCYL. In some embodiments, asymmetric deformation of a membrane or plate may include cylindrical, tip/tilt, and freeform geometries.

According to some embodiments, the combined use of pressure and edge actuation discretization may be used to separately and controllably introduce sphere, asphere, and cylinder deformations to the deformable surface of a mold. The ability to introduce a spherical geometry independent of a cylindrical geometry by the application of pressure to a fluid-filled chamber is illustrated in FIG. 6A. The ability to introduce a cylindrical geometry independent of a spherical geometry by modifying the edge condition of a membrane or plate is illustrated in FIG. 6B. In addition to the foregoing, more advanced sphero-cylinder surfaces defined with higher order Zernike polynomials may be formed using the presently-disclosed pressurized chamber/edge modification paradigm.

Using a suitable pressure within the fluid-filled chamber, the deformable surface may be concave or convex. That is, a negative differential pressure between ambient and the fluid-filled chamber may be used to create a concave deformable surface, whereas a positive differential pressure may be used to form a convex deformable surface.

In accordance with various embodiments, a polymer or glass lens cast over a deformable surface may include a lens main body having a convex side and an opposing concave side. In some examples, the user's prescription may be applied to the convex side of the cast lens. In some examples, the user's prescription may be applied to the concave side of the cast lens. In some examples, the user's prescription may be applied to the convex side and to the concave side. In particular embodiments, the asymmetric element of an ophthalmic product may be applied to the inner concave side of the lens, while the outer convex surface may be maintained as substantially spherical.

Figure 7:
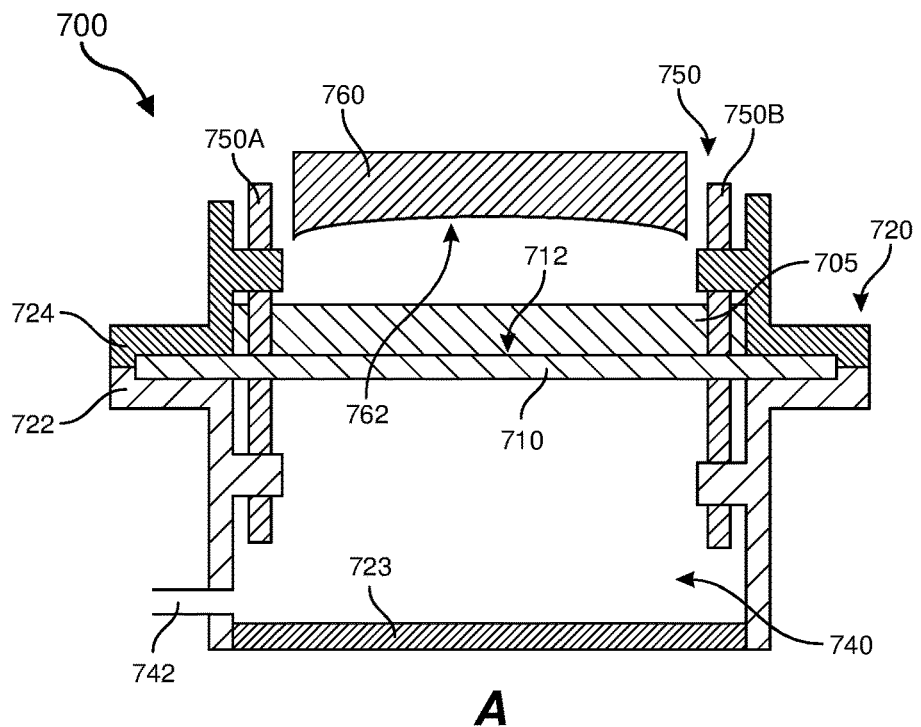
FIG. 7 illustrates a lens casting method using a rigid mold surface and an opposing deformable mold surface according to various embodiments.
Figure 7:
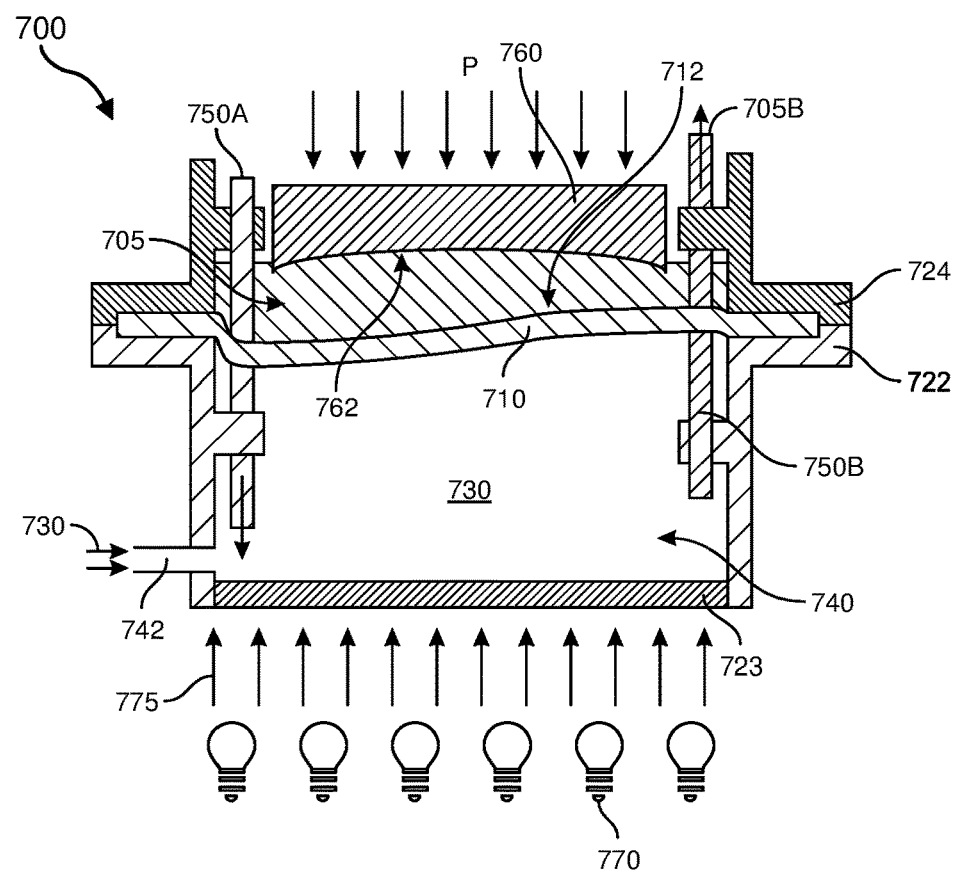
Figure 8:
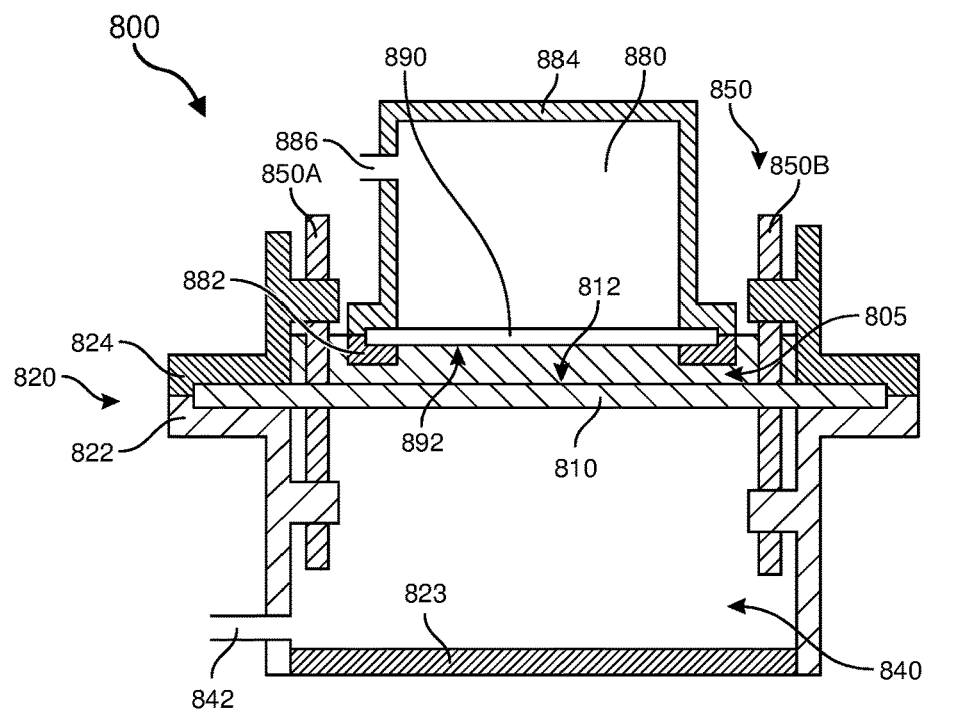
FIG. 8 illustrates a lens casting method using a pair of deformable mold surfaces according to further embodiments.
Figure 8:
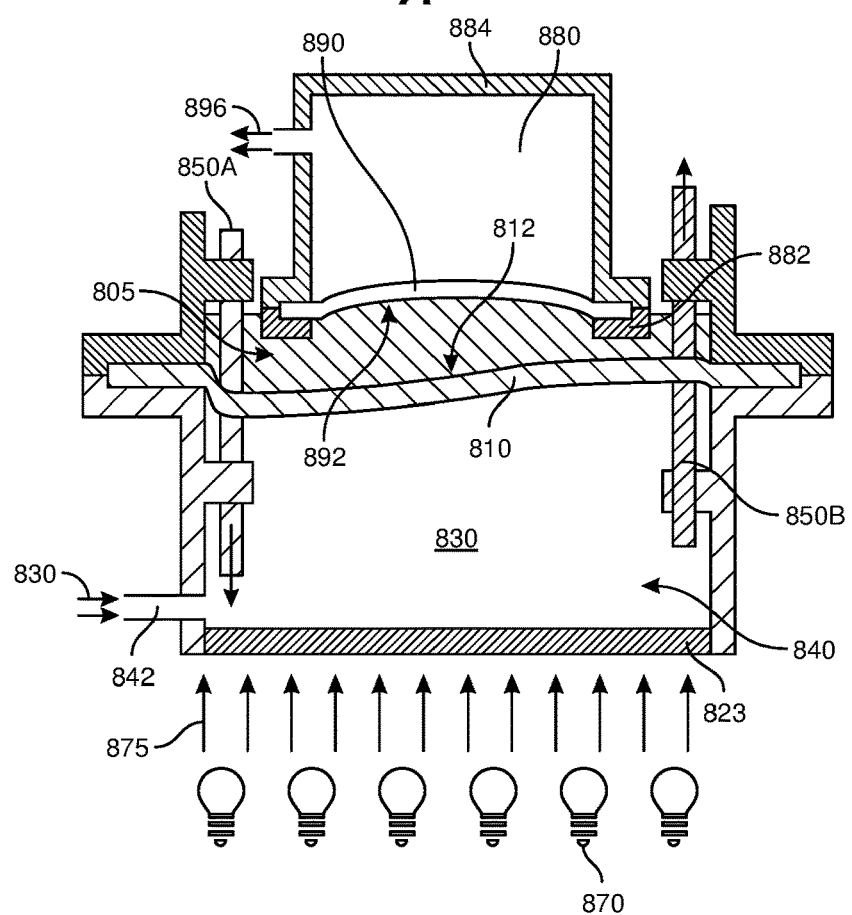

An assembly for casting an optical element may include a rigidly-defined concave (e.g., spherical) surface at the top of the mold and a deformable surface opposing the rigid surface. The deformable surface may be disposed proximate a fluid-filled chamber and coupled to one or more actuators along its periphery. According to further embodiments, the top of the casting assembly may include a first deformable surface with or without edge modification, i.e., to generate spherical surfaces of varying optical power, and a second deformable surface opposing the first deformable surface. The second deformable surface may be disposed proximate a fluid-filled chamber and coupled to one or more actuators along its periphery. Generalized schematic illustrations of ophthalmic lens casting assemblies with rigid and symmetrically deformable top surfaces are shown in FIG. 7 and FIG. 8, respectively.

Referring to FIG. 7A, a lens casting assembly 700 may include a membrane or plate 710 mounted along its periphery between lower frame member 722 and upper frame member 724 of frame 720. Membrane or plate 710 may be transparent, e.g., to UV, visible, and/or infrared radiation. In the illustrated embodiment, membrane or plate 710 may be disposed over a fluid-filled chamber 740 and may include a deformable surface 712.

Fluid pressure within the fluid-filled chamber 740 may be increased or decreased by pumping fluid into or out of the chamber 740 via port 742 in order to apply a positive or negative pressure to a surface of the membrane 710 (e.g., deformable surface 712). A window 723 made of a transparent material may form at least a portion of a wall of the fluid-filled chamber 740.

In the illustrated embodiment, lens casting assembly 700 may further include a rigid member 760 having a rigid surface 762 facing the membrane or plate 710. In some embodiments, rigid member 760 may be transparent, e.g., to UV, visible, and/or infrared radiation. In accordance with some embodiments, rigid member 760 may be slidably attached to frame 720.

A plurality of actuators 750A, 750B, etc., which are collectively referred to herein as actuators 750, may be attached to the periphery of membrane 710 as well as to frame 720 and may be configured to drive a selected asymmetric surface profile onto the deformable surface 712 of membrane 710. For instance, actuators 750 may be independently driven up or down to impart a selected surface profile to membrane 710. That is, actuators 750 may be configured to physically push or pull membrane 710 to drive a symmetric or asymmetric profile onto deformable surface 712. The actuators 750 may be piezoelectric actuators, electrostrictive actuators, or magnetic actuators, for example. According to some embodiments, each actuator 750 may be configured to be driven individually in response to a digital or analog driving signal received by the respective actuator.

As shown in FIG. 7A, a curable liquid 705 may be disposed within the casting assembly 700, i.e., between rigid member 760 and membrane 710. Curable liquid 705 may include a resin or a curable polymer and may be poured or injected into the casting assembly. As shown in FIG. 7B, a pressure (P) may be applied to rigid member 760 and fluid 730 may be pumped into chamber 740 while actuators 750 are driven to selected positions to bring the rigid member 760 and the shaped membrane 710 each into contact with the curable liquid 705. Fluid 730 may include a liquid or a gas. By way of example, actuator 750A may be driven down and actuator 750B may be driven up to provide edge modification of the membrane 710 at discrete points.

With the curable liquid 705 disposed between the rigid surface 762 of rigid member 760 and the deformable surface 712 of shaped membrane 710, the curable liquid 705 may be exposed to radiation 775 (e.g., UV radiation and/or heat) to activate or accelerate the curing of curable liquid 705 into a non-liquid optical part, e.g., prescriptive lens. For example, radiation 775 may be projected from a radiation source 770 upward through window 723 and through membrane 710 onto the curable liquid 705. Radiation source 770 may include an array of individually controlled ultraviolet light sources or heat lamps, for example. After curable liquid 705 has been sufficiently cured, the optical part may be removed from the casting assembly 700.

According to some embodiments, one or both of the rigid surface 762 and the deformable surface 712 may be coated with a non-stick layer having a low coefficient of friction (e.g., polytetrafluoroethylene) to enable the cured optical part to be removed more easily from the casting assembly. According to some embodiments, following the act of curing, one or more of the actuators 750 may be driven (e.g., cyclically driven) to advance release of the cast part from the casting assembly 700.

Referring to FIG. 8, a lens casting assembly 800 according to further embodiments may include a deformable upper mold. As in the embodiment of FIG. 7, lens casting assembly 800 may include a deformable membrane or plate 810 mounted between lower frame member 822 and upper frame member 824 of frame 820. Membrane or plate 810 may be transparent, e.g., to UV, visible, and/or infrared radiation and may be disposed over a lower fluid-filled chamber 840.

Fluid pressure within the lower fluid-filled chamber 840 may be increased or decreased by pumping fluid into or out of the chamber 840 via port 842 in order to apply a positive or negative pressure to a surface of the membrane 810 (e.g., deformable surface 812). The fluid may be a liquid or a gas, for example. A window 823 made of a transparent material may form at least a portion of a wall of the fluid-filled chamber 840.

Lens casting assembly 800 may further include an upper fluid-filled chamber 880. Upper fluid-filled chamber 880 may be formed by a lower frame member 882, an upper frame member 884, and a flexible partition 890 mounted along its periphery between lower frame member 882 and upper frame member 884. Flexible partition 890 may face membrane 810. Fluid pressure within the upper fluid-filled chamber 880 may be increased or decreased by pumping fluid into or out of the chamber 880 via port 886 in order to apply a positive or negative pressure to a surface 892 of flexible partition 890.

A plurality of actuators 850A, 850B, etc., which are collectively referred to herein as actuators 850, may be attached to the periphery of membrane 810 as well as to frame 820 and configured to drive a selected surface profile onto the deformable surface 812 of membrane 810. For instance, actuators 850 may be individually driven up or down to impart a selected surface profile to membrane 810. In some embodiments, actuators 850 may be configured to physically push or pull membrane 810 to drive a selected asymmetric surface profile onto deformable surface 812. The actuators 850 may be piezoelectric actuators, electrostrictive actuators, or magnetic actuators, for example. According to some embodiments, each actuator 850 may be configured to be driven individually in response to a digital or analog driving signal received by the respective actuator.

As shown in FIG. 8A, a curable liquid 805 may be disposed within the lens casting assembly 800, i.e., between flexible partition 890 and membrane 810. Curable liquid 805 may include a resin or a curable polymer and may be poured or injected into the casting assembly 800. As shown in FIG. 8B, fluid 830 may be pumped into lower fluid-filled chamber 840 and fluid 896 may be pumped out of upper fluid-filled chamber 880 while actuators 850 are driven to selected positions to bring the flexible partition 890 and the membrane 810 each into contact with the curable liquid 805. By way of example, as shown in FIG. 8B, actuator 850A may be driven down and actuator 850B may be driven up.

According to certain embodiments, the pressure exerted by fluid-filled chambers 840, 890 may introduce symmetric deformation to the lower and upper surfaces of the curable liquid, respectively, prior to curing whereas the actuator settings may introduce a desired asymmetric deformation to the lower surface of the curable liquid.

With the curable liquid disposed between the surface 892 of flexible partition 890 and the deformable surface 812 of membrane 810, the curable liquid 805 may be exposed to radiation 875 (e.g., UV radiation and/or heat) to activate or accelerate the curing of curable liquid 805 into a non-liquid optical part, e.g., prescriptive lens, having the surface profiles of deformable surface 812 and surface 892. For example, radiation 875 may be projected from a radiation source 870 through window 823 and through membrane 810 onto the curable liquid 805. Radiation source 870 may include an array of individually controlled ultraviolet light sources or heat lamps, for example. After curable liquid 805 has been sufficiently cured, the optical part may be removed from the casting assembly 800.

According to some embodiments, one or both of the surface 892 of flexible partition 890 and the deformable surface 812 of deformable membrane 810 may be coated with a non-stick layer having a low coefficient of friction (e.g., polytetrafluoroethylene) to enable the cured optical part to be removed more easily from the casting assembly. According to some embodiments, following the act of curing, one or more of the actuators 850 may be driven to release the cast part from the casting assembly 800.

Although the lens casting assemblies of FIGS. 7 and 8 are described in the context of ophthalmic optics, according to further embodiments, alternate arrangements of one or more fluid-filled chambers and edge actuators may be used to create optical elements for non-ophthalmic applications. For instance, additional fluid-filled chambers and/or edge actuators may be used to introduce higher order Zernike perturbations. In particular embodiments, fluid pumping may modify the shape of a fluid-filled chamber, which may affect the edge boundary conditions and hence cylindricality as well as sphericity or asphericity of a deformable surface.

Figure 9:
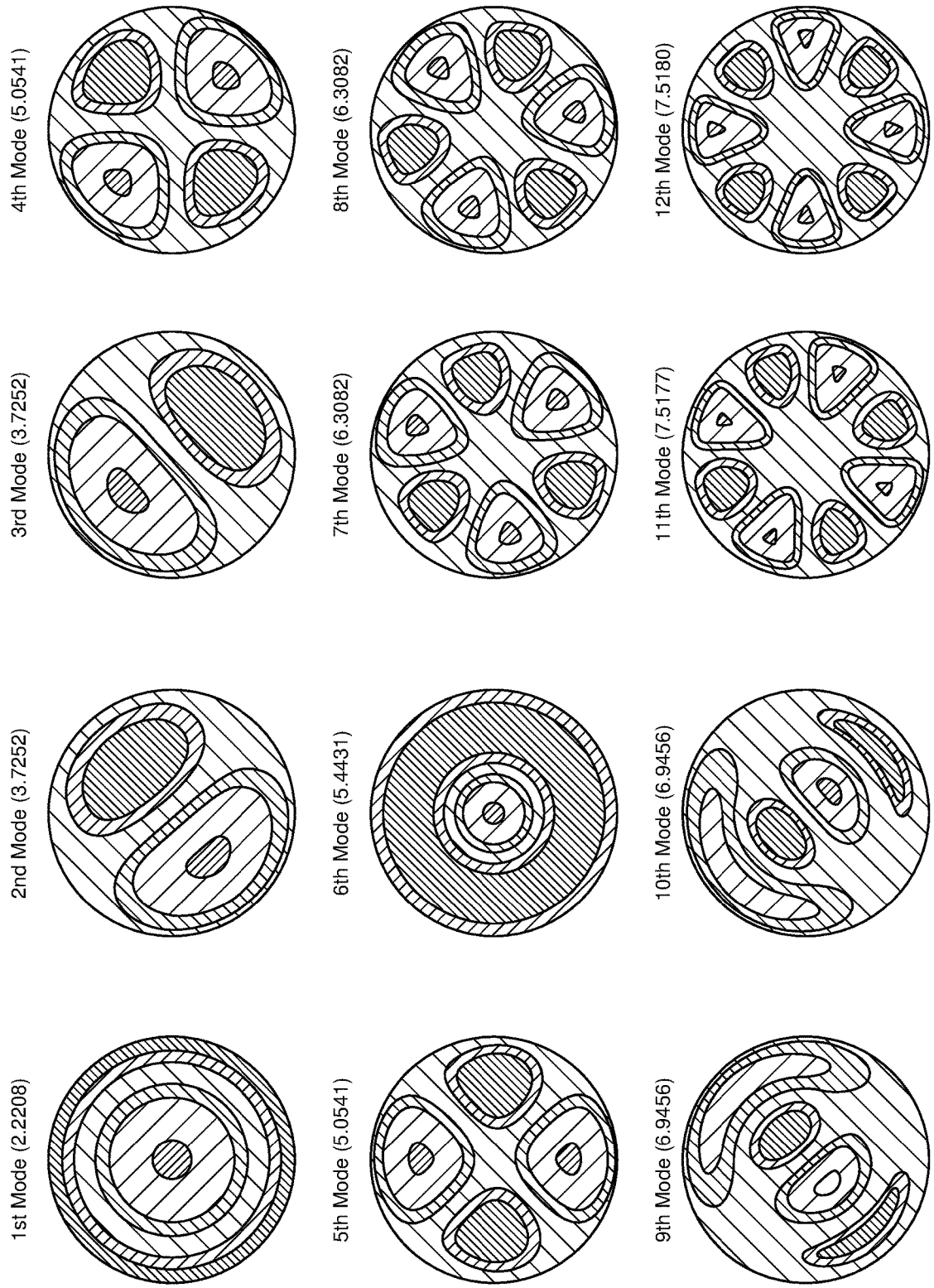
FIG. 9 shows fundamental and higher order resonant mode shapes of a thin circular plate associated with different pressure dynamics imposed on the plate according to some embodiments.
Figure 9:
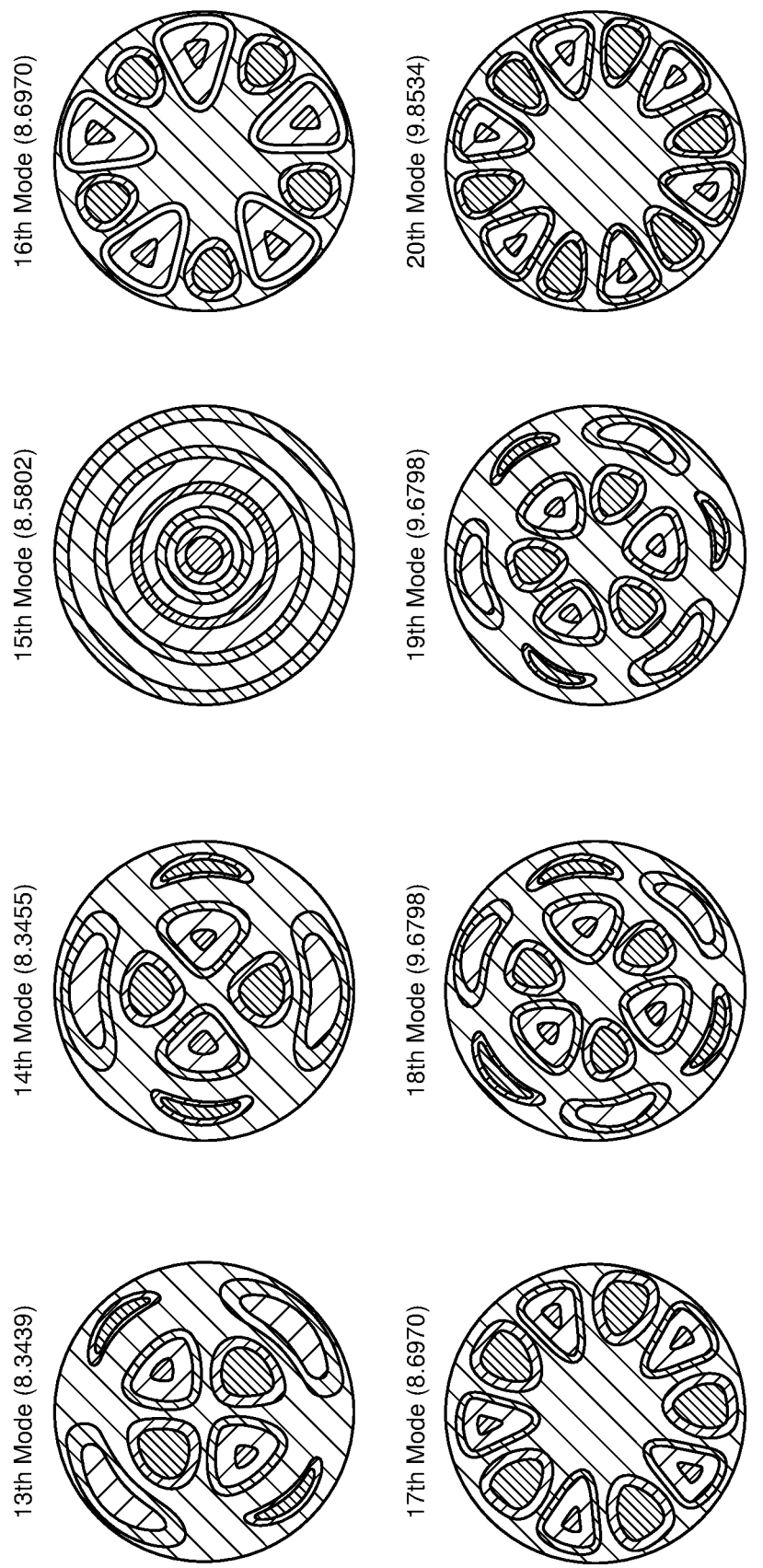

In various embodiments, the casting assembly and the attendant modification of the deformable surface(s) may be operated in a static or quasi-static mode, where the deformation conditions may be set prior to, during, or after introducing the curable liquid to the mold. In further embodiments, dynamic excitation of the deformable surface(s) may be used. The addition of a high frequency, ultrasonic signal, for example, may be used to improve surface quality and/or promote release of the cast lens from the deformable surface after curing. Resonant excitation of a deformable surface may generate standing waves, which when synchronized with shuttering of a UV light source for curing, may enable molding of more complex, freeform surfaces. According to further embodiments, shown in FIG. 9 are the fundamental and higher order resonant mode shapes of a thin circular plate. The mode shapes, which set the surface form of a cast lens-forming liquid, may be controlled by tuning the frequency of pressure fluctuations within a fluid-filled chamber located proximate to the plate in an example casting assembly.

Figure 10:
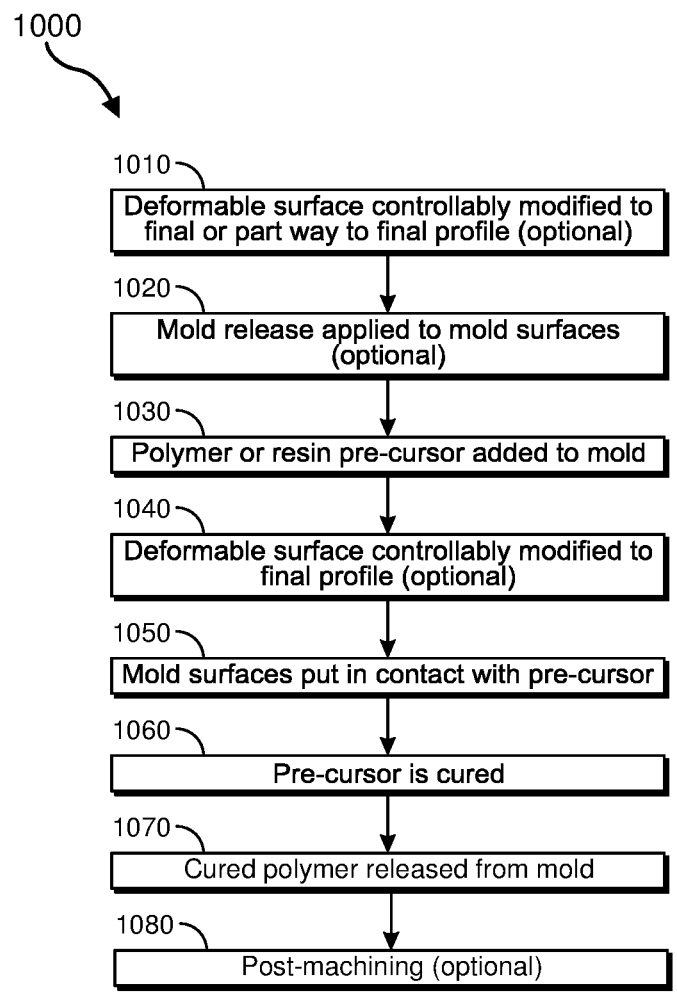
FIG. 10 shows a flowchart of an example method of forming an optical element according to certain embodiments.
Figure 11:
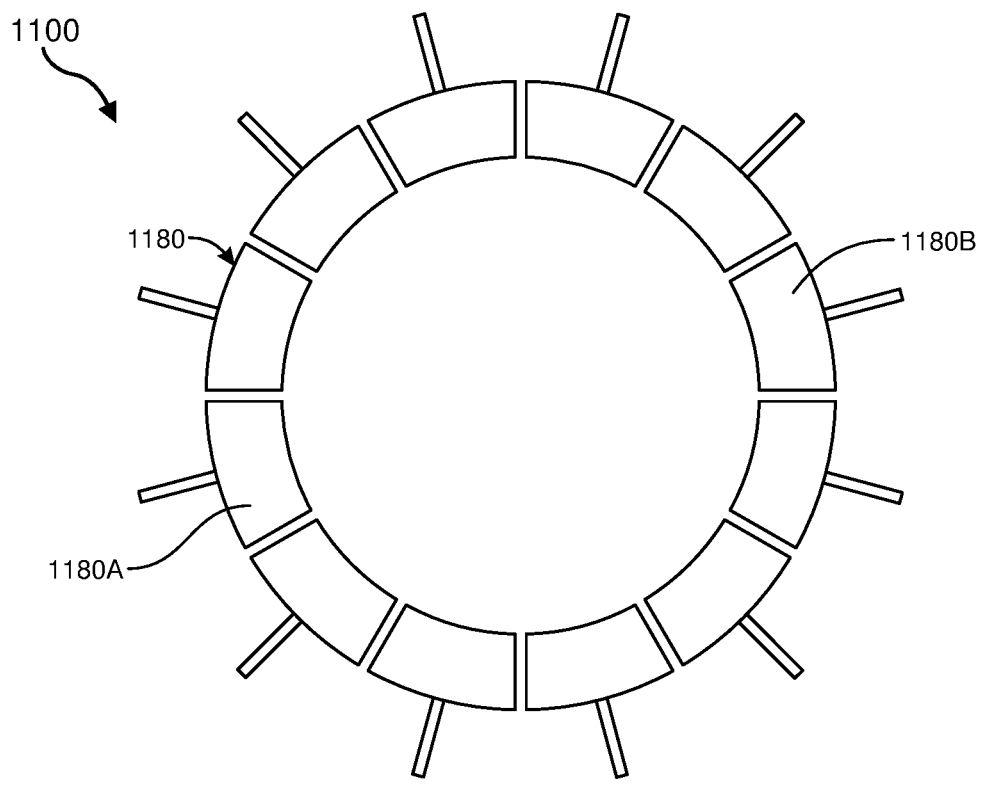
FIG. 11 is a schematic illustration of a lens casting assembly including a peripheral array of fluid bladders configured to introduce cylindrical correction to a deformable membrane according to some embodiments.
Figure 11:
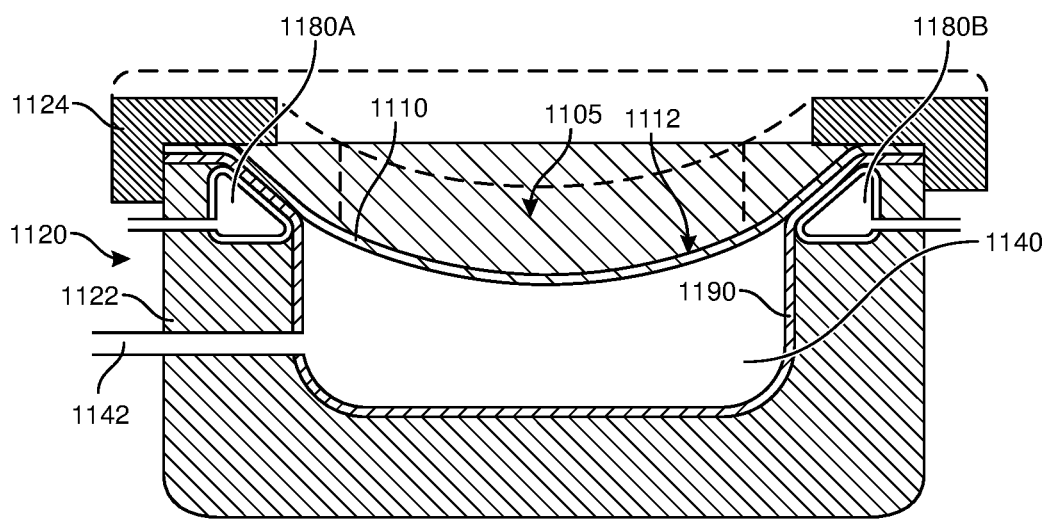

An example process for forming an optical element using a casting assembly having a mold with at least one deformable surface is set forth in the flowchart of FIG. 10. At step 1010, the deformable surface of a membrane or plate may be manipulated to exhibit the intended casting profile. At step 1020, a mold release layer and/or barrier layer may be applied to one or more of the mold surfaces, including one or more deformable surfaces. A mold release layer or barrier layer, if used, may serve as a temporary coating to alleviate incompatibility issues between the deformable surface and the lens-forming liquid. A mold release layer or barrier layer may include a polymer coating, for example. A mold release layer or barrier layer may include an antireflective coating.

At step 1030, according to various embodiments, an uncured, amorphous polymer, resin, or polymer solution (i.e., curable liquid) is cast into the mold and, at step 1040, the deformable surface(s) may be controllably modified to achieve the final desired deflection profile, including both spherical and cylindrical components. At step 1050, the curable liquid is contacted with the deformable surface(s) and, at step 1060, the curable liquid is cured. The curable liquid may be cured by exposure to heat and/or radiation.

After curing, at step 1070, the cast polymer may be released from the mold. The release process may be assisted by controllably modifying the deformable surface(s) to separate the cured polymer from the deformable surface. At step 1080, the cast polymer may be machined to achieve a desired optic shape. In accordance with some embodiments, for reflective optic applications a mirror coating such as a metal layer may be applied to a surface of the cast polymer.

The order in which some or all of the process blocks appearing in process 1000 should not be deemed limiting. Rather, one of ordinary skill in the art having the benefit of the present disclosure will understand that some of the process blocks may be executed in a variety of orders not illustrated, or even in parallel.

Further casting apparatus, including fluid-filled chamber-based approaches for modifying the boundary (edge) conditions of a deformable membrane or plate, are illustrated in FIGS. 11-14. According to some embodiments, FIGS. 11A and 11B show plan view and cross-sectional schematic illustrations, respectively, of an example lens casting assembly. Lens casting assembly 1100 may include a membrane 1110 supported along its periphery by lower frame member 1122 and upper frame member (e.g., clamping ring) 1124 of frame 1120. Membrane 1110, which may be pre-tensioned, may overlie a chamber 1140. Pressure within the chamber 1140 may be increased or decreased by pumping fluid into or out of the chamber 1140 via port 1142 in order to apply a positive or negative pressure to a surface of the membrane 1110. The amount of pressure exerted by a fluid on membrane 1110 may be used to adjust the amount of spherical power in a lens cast over the deformable surface 1112 of membrane 1110.

Lens casting assembly 1100 may further include a plurality of deformable bladders 1180 located around the periphery of membrane 1110. Each deformable bladder 1180A, 1180B, etc. may be configured to exert a localized positive or negative pressure along the edge of membrane 1110, which may affect an amount of cylindrical power in a lens cast over the deformable surface 1112. The plurality of annularly-disposed bladders 1180 may be configured to control the cylindrical power of a cast lens by applying a local, segmented force along a periphery of the deformable membrane 1110. The deformable bladders 1180 may apply a force to the membrane along a radial direction with respect to an axis of the lens casting assembly 1100, along a dimension orthogonal to a radial direction, or combinations thereof. Thus, as will be appreciated, according to certain embodiments, deformable bladders 1180 may be actuators.

In some embodiments, deformable bladders 1180 may be individually controlled to create a desired edge displacement in membrane 1110. During operation of lens casting assembly 1100, a synchronized pressure distribution amongst the plurality of bladders 1180 may cooperate with a selected fluid pressure within chamber 1140 to impart a desired surface profile to deformable surface 1112. In accordance with various embodiments, a curable liquid 1105 may be disposed within the assembly 1100, i.e., directly over the deformable surface 1112 of membrane 1110 and cured to form an optical element such as a lens having a surface profile matching the deformable surface 1112. As will be appreciated, curable liquid 1105 may be introduced into lens casting assembly 1100 before or after establishing the surface profile of the membrane 1110.

In the illustrated embodiment, a compliant liner or mold release layer 1190 such as a layer having a low coefficient of friction may be disposed between membrane 1110 and bladders 1180 to lessen binding and enable consistent interplay therebetween, which may promote a reproducible and more uniform configuration of the deformable surface 1112. A compliant liner or mold release layer 1190 may include a flexible polymer material, for example. In certain embodiments, the compliant liner or mold release layer 1190 may be disposable.

Figure 12:
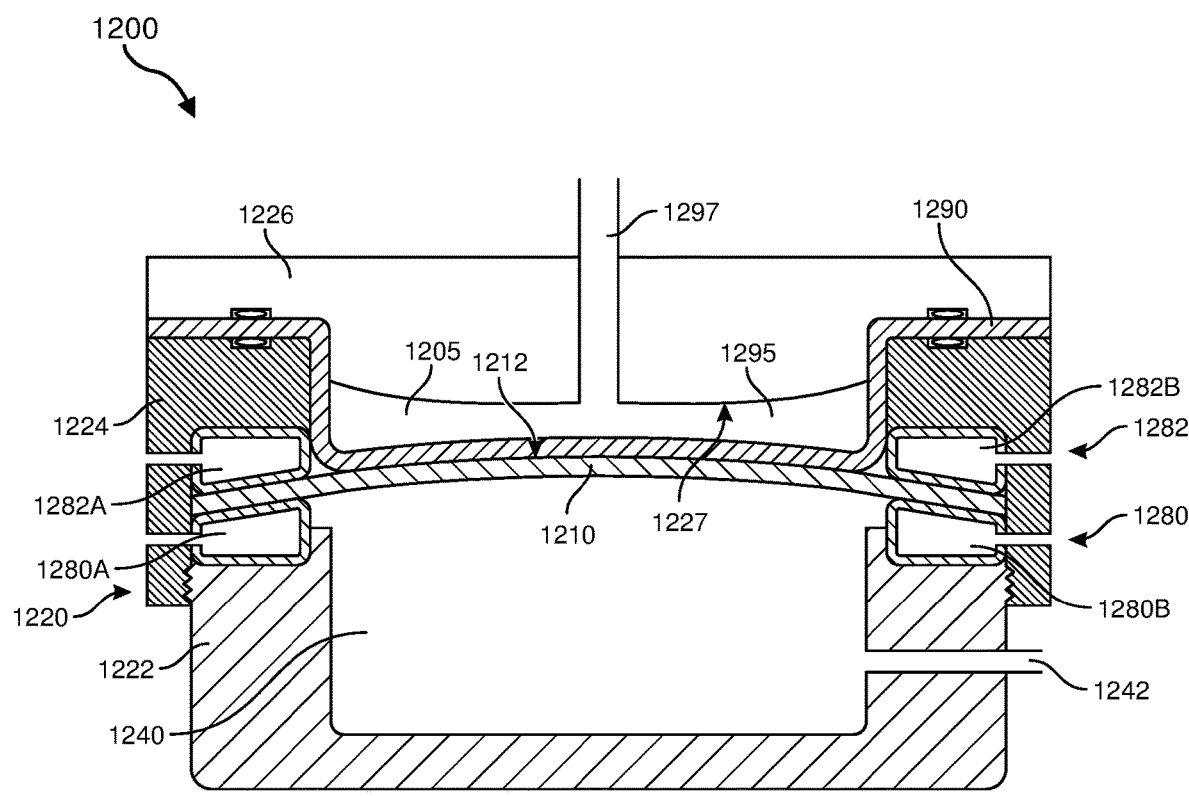
FIG. 12 is a schematic illustration of a lens casting assembly including a peripheral array of opposing fluid bladders configured to introduce cylindrical correction to a deformable membrane according to some embodiments.

According to further embodiments, referring to FIG. 12, lens casting assembly 1200 may include a membrane 1210 disposed between a lower frame member 1222 and an intermediate frame member 1224 of frame 1220. In certain embodiments, membrane 1210 may be pre-tensioned. Membrane 1210 may overlie a chamber 1240 formed in frame 1220. Pressure within the chamber 1240 may be increased or decreased by pumping fluid into or out of the chamber 1240 via port 1242 in order to apply a positive or negative pressure to a surface of the membrane 1210 (e.g., deformable surface 1212). The amount of pressure exerted by a fluid on membrane 1210 may be used to adjust the amount of spherical power in a lens cast over the deformable surface 1212.

Lens casting assembly 1200 may further include paired deformable bladders located around the periphery of membrane 1210. The paired deformable bladders may include a lower array of deformable bladders 1280 and an upper, opposing array of deformable bladders 1282. Each deformable bladder pair (e.g., bladder pair 1280A and 1282A and bladder pair 1280B and 1282B) may be in direct contact with a lower and upper surface of membrane 1210, respectively, and may be configured to exert localized (positive or negative) pressure to the membrane edge, which may affect an amount of cylindrical power in a lens cast over the deformable surface 1212 of membrane 1210. Thus, deformable bladders 1280, 1282 may be actuators. According to various embodiments, the pressure within each deformable bladder 1280, 1282 may be independently controlled such that a differential pressure within each bladder pair may be used to exert a desired pressure on membrane 1210. In accordance with various embodiments, sphericity or asphericity and cylindricality of the deformable surface 1212 may be respectively controlled by fluid pressure within chamber 1240 and fluid pressure within deformable bladders 1280, 1282.

In some embodiments, a compliant liner or mold release layer 1290 such as a flexible polymer layer having a low coefficient of friction may be disposed over membrane 1210. In some embodiments, the compliant liner or mold release layer 1290 may be bonded to membrane 1210 using a suitable adhesive, such as an epoxy compound. As illustrated in FIG. 12, an upper frame member 1226 may be disposed over intermediate frame member 1224 defining a mold cavity 1295 between the upper frame member 1226 and membrane 1210. Mold cavity 1295 may directly overlie mold release layer 1290 or, in embodiments where the mold release layer 1290 is omitted, mold cavity 1295 may directly overlie membrane 1210. During an example casting process, a curable liquid 1205 may be introduced into mold cavity 1295, i.e., between upper frame member 1226 and membrane 1210. Curable liquid 1205 may be introduced into lens casting assembly 1200 before or after establishing the surface profile of membrane 1210. Curable liquid 1205 may include a resin or a curable polymer and may be poured or injected into the mold cavity 1295 via material port 1297 and then cured by exposure to UV radiation, for example. In some embodiments, upper frame member 1226 may form an upper mold element having a rigid surface 1227 arranged to contact the curable liquid 1205 during a casting operation. Rigid surface 1227 may be planar or may be characterized by concave and/or convex curvature.

Figure 13:
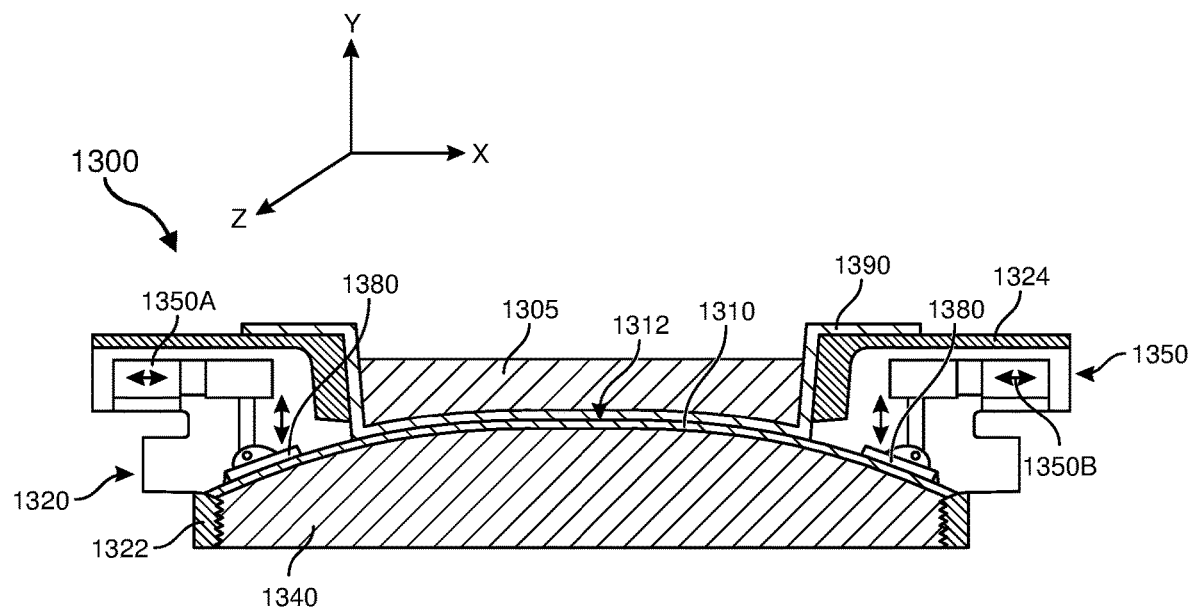
FIG. 13 is a schematic illustration of a lens casting assembly including a plurality of mechanical actuators configured to introduce cylindrical correction to a deformable membrane according to certain embodiments.

According to further embodiments, an example lens casting assembly configured to utilize mechanical actuation in addition to fluid-induced pressure to create a combination of asymmetric and symmetric distortions in a deformable membrane is shown schematically in FIG. 13. Lens casting assembly 1300 may include a membrane 1310 disposed along its periphery over a lower frame member 1322 of frame 1320. In some embodiments, a peripheral edge of membrane 1310 may be disposed directly over lower frame member 1322.

Membrane 1310 may overlie a chamber 1340 formed in frame 1320. Pressure within the chamber 1340 may be increased or decreased by pumping fluid into or out of the chamber 1340 in order to apply a positive or negative pressure to a surface of the membrane 1310 (e.g., deformable surface 1312). The fluid may include a liquid (e.g., gel) or gas, for example. The amount of pressure exerted by a fluid on membrane 1310 may be used to adjust an amount of spherical power in a lens cast over the deformable surface 1312 of membrane 1310.

Lens casting assembly 1300 may further include a plurality of annularly-disposed actuators 1350A, 1350B, etc. (collectively actuators 1350) that are configured to apply a localized force to a respective plurality of edge regions of membrane 1310. For instance, actuators 1350 may cooperatively exert a force on membrane 1310 via a flexible, annular ring 1380, which may be bonded to membrane 1310 and coupled to each actuator 1350. According to certain embodiments, actuators 1350 may be individually driven along mutually-orthogonal x, y and/or z directions to impart a selected surface profile to deformable membrane 1310 by shaping the flexible ring 1380. That is, in certain embodiments, actuators 1350 may be configured to physically push or pull flexible ring 1380 to adjust an amount of cylindrical power in a lens cast over the deformable surface 1312. For instance, actuators 1350 may be driven to impart low order coefficients of Zernike terms of a Zernike polynomial that defines a desired surface profile. Actuators 1350 may be piezoelectric actuators, electrostrictive actuators, or magnetic actuators, for example.

A compliant liner or mold release layer 1390 such as a flexible polymer layer having a low coefficient of friction may be disposed over membrane 1310. In some embodiments, the compliant liner or mold release layer 1390 may extend also over upper frame member 1324 and may be bonded to membrane 1310 using a suitable adhesive such as an epoxy compound.

In the illustrated embodiment, a curable liquid 1305 may be disposed over the deformed membrane 1310, i.e., directly over compliant liner/mold release layer 1390. Curable liquid 1305 may be introduced into lens casting assembly 1300 before or after establishing the surface profile of membrane 1310. Prior to curing, e.g., by UV exposure, an optional top mold (not shown) may be brought into contact with a top surface of the curable liquid 1305, e.g., to define a desired top surface of a cast lens.

Figure 14:
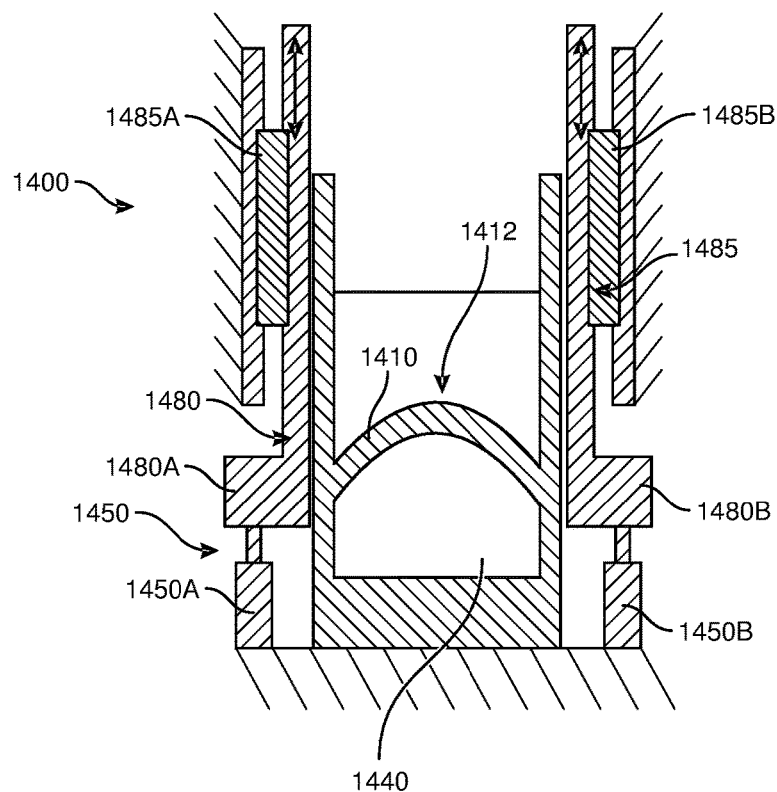
FIG. 14 is a schematic illustration of a lens casting assembly including a plurality of linear actuators configured to introduce cylindrical correction to a deformable membrane according to further embodiments.

According to still further embodiments, an example lens casting assembly utilizing a peripheral array of linear actuators in combination with a fluid-filled chamber to respectively introduce cylindrical and spherical distortions to a deformable membrane or plate for fabricating an optical element is shown schematically in FIG. 14. In the cross-sectional view of FIG. 14, lens casting assembly 1400 may include a deformable membrane 1410 overlying a chamber 1440.

Pressure within chamber 1440 may be adjusted by pumping fluid such as a liquid or a gas into or out of the chamber 1440 in order to apply a positive or negative pressure to a surface of the membrane 1410 (e.g., deformable surface 1412). The amount of pressure exerted by a fluid on membrane 1410 may be used to adjust an amount of spherical power in a lens cast over the deformable surface 1412.

Lens casting assembly 1400 may further include a plurality of actuators 1450A, 1450B, etc. (collectively actuators 1450), which may be arranged peripheral to membrane 1410 and configured to apply a localized force to a respective plurality of edge regions of the membrane 1410. For instance, each actuator 1450 may be driven up or down to exert a force on membrane 1410, e.g., via respective segmented arms 1480A, 1480B, etc. (collectively segmented arms 1480) that are attached to a corresponding edge of the membrane 1410. That is, in certain embodiments, actuators 1450 may be configured to physically push or pull a moveable arm 1480 to adjust an amount of cylindrical power in a lens cast over the deformable surface 1412 of membrane 110. Each arm 1480, e.g., arms 1480A and 1480B, may be slidably coupled to a respective guide member 1485A, 1485B (collectively guide members 1485). Actuators 1450 may be piezoelectric actuators, electrostrictive actuators, or magnetic actuators, for example.

As disclosed herein, an assembly for casting polymer lenses may include a mold having a deformable surface adjacent to a fluid-filled chamber. The pressure within the fluid-filled chamber and edge conditions of the deformable surface may be independently modified to achieve a desired deflection profile across the deformable surface. Separate control of the fluid pressure within the chamber and edge actuators, for example, effectively decouples the symmetric and asymmetric lens profile contributions, respectively. That is, in some embodiments, a pressure change within the fluid-filled chamber may be used to create axisymmetric deflections of the deformable surface, including spherical or aspherical contributions to the deflection profile, whereas modifications of the edge conditions may create a non-axisymmetric (e.g., an asymmetric) deflection of the deformable surface, including cylindrical, prismatic, tip/tilt, and/or freeform contributions, thus enabling the formation of a high-quality prescriptive lens or other optical element in a single casting step. An optically transparent amorphous polymer, resin, or polymer solution may be added to the mold and cured while in contact with the deformable surface to form a polymer lens displaying both spherical and cylindrical correction. The addition of a high frequency, ultrasonic signal may be used to improve surface quality and/or promote release of the lens after curing. The assembly may be used to cast refractive optics such as lenses, e.g., ophthalmic lenses, as well as reflective optics such as mirrors. The disclosed method and associated casting assembly may enable point-of-distribution manufacturing.

EXAMPLE EMBODIMENTS

Example 1: A method includes providing a precursor to a mold, where the mold includes a deformable surface overlying a chamber, shaping the deformable surface according to a surface profile by adjusting a fluid pressure within the chamber and driving one or more actuators that are configured to distort the deformable surface, and solidifying the precursor while the deformable surface is shaped according to the surface profile to form an optical element.

Example 2: The method of Example 1, where the precursor includes an optically transparent resin, amorphous polymer, or polymer solution.

Example 3: The method of Example 2, where solidifying the precursor includes exposing the precursor to electromagnetic radiation.

Example 4: The method of Example 1, where the precursor includes a low melting temperature glass.

Example 5: The method of any of Examples 1-4, where the deformable surface includes a transparent material selected from a polymer, a glass, a ceramic, and sapphire.

Example 6: The method of any of Examples 1-5, where the actuators include bladders located along a periphery of the deformable surface.

Example 7: The method of any of Examples 1-6, where adjusting the fluid pressure changes sphericity or asphericity of the deformable surface and driving the one or more actuators changes cylindricality of the deformable surface.

Example 8: The method of any of Examples 1-7, where the surface profile includes at least one of spherical, aspherical, and cylindrical geometries.

Example 9: The method of any of Examples 1-8, where solidifying the precursor includes driving a plurality of individually controlled heat sources to different power levels or driving a plurality of individually controlled ultraviolet light sources to different emission levels.

Example 10: The method of any of Examples 1-9, further including forming a release layer or an antireflective coating over the deformable surface prior to providing the precursor to the mold.

Example 11: The method of any of Examples 1-10, further including capturing an image of the deformable surface while the precursor is disposed within the mold, and adjusting the fluid pressure within the chamber and/or adjusting the one or more actuators in response to the image prior to solidifying the precursor.

Example 12: The method of Example 11, where capturing the image includes illuminating the deformable surface with illumination light that propagates through the precursor.

Example 13: The method of any of Examples 11 and 12, where capturing the image includes an image sensor receiving the illumination light through a lenslet array subsequent to the illumination light reflecting off of or passing through the deformable surface.

Example 14: The method of any of Examples 1-13, further including removing the optical element from the mold by driving one or more of the actuators.

Example 15: The method of any of Examples 1-14, where the optical element includes an ophthalmic lens.

Example 16: The method of any of Examples 1-15, further including forming a reflective coating over a surface of the optical element.

Example 17: A casting assembly includes a deformable surface overlying a chamber and a plurality of actuators located along a periphery of the deformable surface, where the actuators are configured to apply pressure to and remove pressure from respective regions of the deformable surface.

Example 18: The casting assembly of Example 17, where the plurality of actuators include deformable bladders configured to introduce a cylindrical correction to the deformable surface.

Example 19: A casting assembly includes a deformable surface located proximate to a fluid-filled chamber, and a plurality of actuators disposed along a peripheral edge of the deformable surface, where a pressure change within the fluid-filled chamber creates an axisymmetric deflection of the deformable surface and motion of at least one of the actuators creates a non-axisymmetric deflection of the deformable surface.

Example 20: The casting assembly of Example 19, where a pressure within the fluid-filled chamber and each of the actuators are independently controlled.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (e.g., augmented-reality system 1500 in FIG. 15) or that visually immerses a user in an artificial reality (e.g., virtual-reality system 1600 in FIG. 16). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 15:
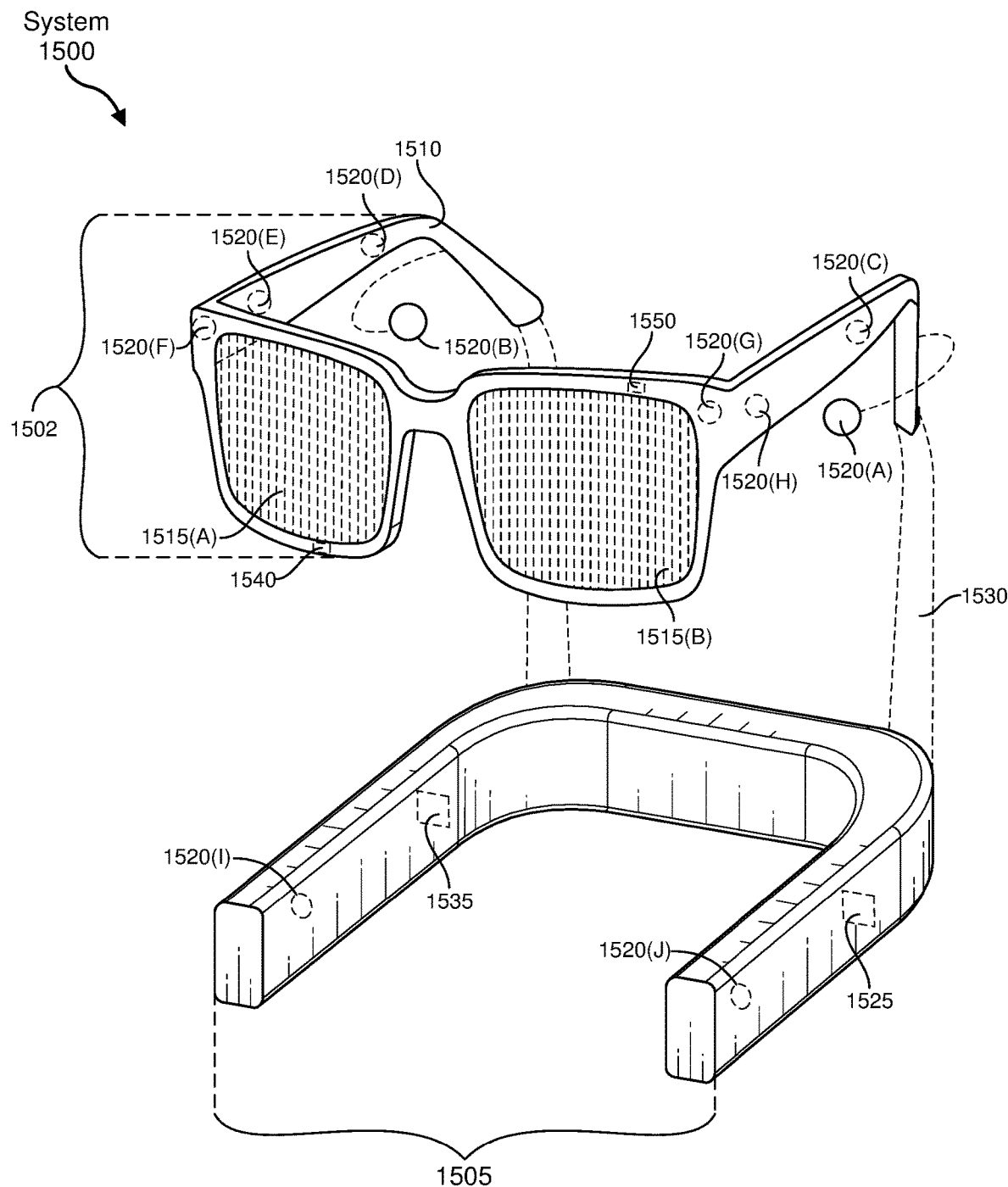
FIG. 15 is an illustration of exemplary augmented-reality glasses that may be used in connection with embodiments of this disclosure.
Figure 16:
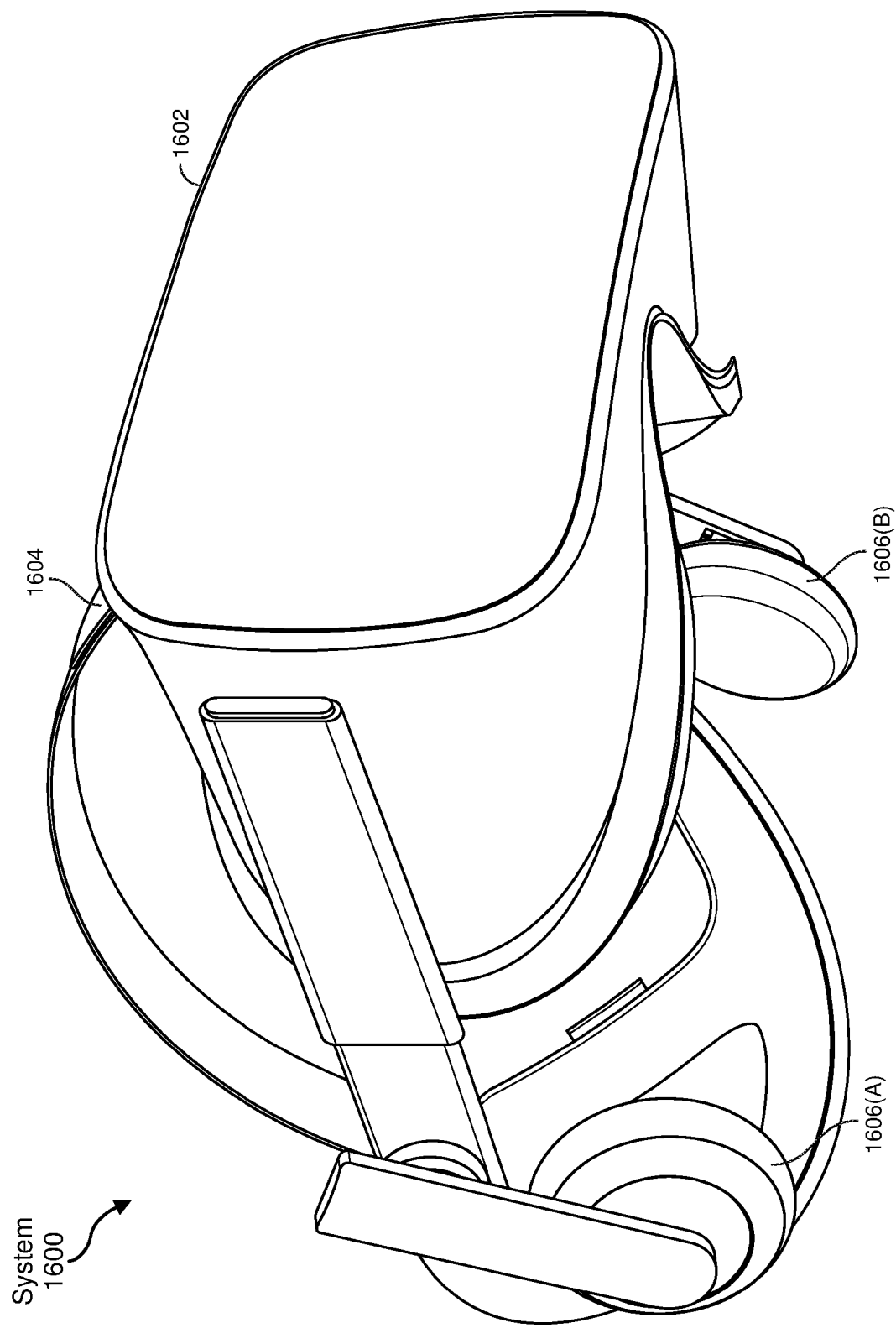
FIG. 16 is an illustration of an exemplary virtual-reality headset that may be used in connection with embodiments of this disclosure.

Turning to FIG. 15, augmented-reality system 1500 may include an eyewear device 1502 with a frame 1510 configured to hold a left display device 1515(A) and a right display device 1515(B) in front of a user's eyes. Display devices 1515(A) and 1515(B) may act together or independently to present an image or series of images to a user. While augmented-reality system 1500 includes two displays, embodiments of this disclosure may be implemented in augmented-reality systems with a single NED or more than two NEDs.

In some embodiments, augmented-reality system 1500 may include one or more sensors, such as sensor 1540. Sensor 1540 may generate measurement signals in response to motion of augmented-reality system 1500 and may be located on substantially any portion of frame 1510. Sensor 1540 may represent a position sensor, an inertial measurement unit (IMU), a depth camera assembly, a structured light emitter and/or detector, or any combination thereof. In some embodiments, augmented-reality system 1500 may or may not include sensor 1540 or may include more than one sensor. In embodiments in which sensor 1540 includes an IMU, the IMU may generate calibration data based on measurement signals from sensor 1540. Examples of sensor 1540 may include, without limitation, accelerometers, gyroscopes, magnetometers, other suitable types of sensors that detect motion, sensors used for error correction of the IMU, or some combination thereof.

Augmented-reality system 1500 may also include a microphone array with a plurality of acoustic transducers 1520(A)-1520(J), referred to collectively as acoustic transducers 1520. Acoustic transducers 1520 may be transducers that detect air pressure variations induced by sound waves. Each acoustic transducer 1520 may be configured to detect sound and convert the detected sound into an electronic format (e.g., an analog or digital format). The microphone array in FIG. 15 may include, for example, ten acoustic transducers: 1520(A) and 1520(B), which may be designed to be placed inside a corresponding ear of the user, acoustic transducers 1520(C), 1520(D), 1520(E), 1520(F), 1520(G), and 1520(H), which may be positioned at various locations on frame 1510, and/or acoustic transducers 1520(I) and 1520(J), which may be positioned on a corresponding neckband 1505.

In some embodiments, one or more of acoustic transducers 1520(A)-(F) may be used as output transducers (e.g., speakers). For example, acoustic transducers 1520(A) and/or 1520(B) may be earbuds or any other suitable type of headphone or speaker.

The configuration of acoustic transducers 1520 of the microphone array may vary. While augmented-reality system 1500 is shown in FIG. 15 as having ten acoustic transducers 1520, the number of acoustic transducers 1520 may be greater or less than ten. In some embodiments, using higher numbers of acoustic transducers 1520 may increase the amount of audio information collected and/or the sensitivity and accuracy of the audio information. In contrast, using a lower number of acoustic transducers 1520 may decrease the computing power required by an associated controller 1550 to process the collected audio information. In addition, the position of each acoustic transducer 1520 of the microphone array may vary. For example, the position of an acoustic transducer 1520 may include a defined position on the user, a defined coordinate on frame 1510, an orientation associated with each acoustic transducer 1520, or some combination thereof.

Acoustic transducers 1520(A) and 1520(B) may be positioned on different parts of the user's ear, such as behind the pinna, behind the tragus, and/or within the auricle or fossa. Or, there may be additional acoustic transducers 1520 on or surrounding the ear in addition to acoustic transducers 1520 inside the ear canal. Having an acoustic transducer 1520 positioned next to an ear canal of a user may enable the microphone array to collect information on how sounds arrive at the ear canal. By positioning at least two of acoustic transducers 1520 on either side of a user's head (e.g., as binaural microphones), augmented-reality device 1500 may simulate binaural hearing and capture a 3D stereo sound field around about a user's head. In some embodiments, acoustic transducers 1520(A) and 1520(B) may be connected to augmented-reality system 1500 via a wired connection 1530, and in other embodiments acoustic transducers 1520(A) and 1520(B) may be connected to augmented-reality system 1500 via a wireless connection (e.g., a Bluetooth connection). In still other embodiments, acoustic transducers 1520(A) and 1520(B) may not be used at all in conjunction with augmented-reality system 1500.

Acoustic transducers 1520 on frame 1510 may be positioned along the length of the temples, across the bridge, above or below display devices 1515(A) and 1515(B), or some combination thereof. Acoustic transducers 1520 may be oriented such that the microphone array is able to detect sounds in a wide range of directions surrounding the user wearing the augmented-reality system 1500. In some embodiments, an optimization process may be performed during manufacturing of augmented-reality system 1500 to determine relative positioning of each acoustic transducer 1520 in the microphone array.

In some examples, augmented-reality system 1500 may include or be connected to an external device (e.g., a paired device), such as neckband 1505. Neckband 1505 generally represents any type or form of paired device. Thus, the following discussion of neckband 1505 may also apply to various other paired devices, such as charging cases, smart watches, smart phones, wrist bands, other wearable devices, hand-held controllers, tablet computers, laptop computers, other external compute devices, etc.

As shown, neckband 1505 may be coupled to eyewear device 1502 via one or more connectors. The connectors may be wired or wireless and may include electrical and/or non-electrical (e.g., structural) components. In some cases, eyewear device 1502 and neckband 1505 may operate independently without any wired or wireless connection between them. While FIG. 15 illustrates the components of eyewear device 1502 and neckband 1505 in example locations on eyewear device 1502 and neckband 1505, the components may be located elsewhere and/or distributed differently on eyewear device 1502 and/or neckband 1505. In some embodiments, the components of eyewear device 1502 and neckband 1505 may be located on one or more additional peripheral devices paired with eyewear device 1502, neckband 1505, or some combination thereof.

Pairing external devices, such as neckband 1505, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1500 may be provided by a paired device or shared between a paired device and an eyewear device, thus reducing the weight, heat profile, and form factor of the eyewear device overall while still retaining desired functionality. For example, neckband 1505 may allow components that would otherwise be included on an eyewear device to be included in neckband 1505 since users may tolerate a heavier weight load on their shoulders than they would tolerate on their heads. Neckband 1505 may also have a larger surface area over which to diffuse and disperse heat to the ambient environment. Thus, neckband 1505 may allow for greater battery and computation capacity than might otherwise have been possible on a stand-alone eyewear device. Since weight carried in neckband 1505 may be less invasive to a user than weight carried in eyewear device 1502, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1505 may be communicatively coupled with eyewear device 1502 and/or to other devices. These other devices may provide certain functions (e.g., tracking, localizing, depth mapping, processing, storage, etc.) to augmented-reality system 1500. In the embodiment of FIG. 15, neckband 1505 may include two acoustic transducers (e.g., 1520(I) and 1520(J)) that are part of the microphone array (or potentially form their own microphone subarray). Neckband 1505 may also include a controller 1525 and a power source 1535.

Acoustic transducers 1520(I) and 1520(J) of neckband 1505 may be configured to detect sound and convert the detected sound into an electronic format (analog or digital). In the embodiment of FIG. 15, acoustic transducers 1520(I) and 1520(J) may be positioned on neckband 1505, thereby increasing the distance between the neckband acoustic transducers 1520(I) and 1520(J) and other acoustic transducers 1520 positioned on eyewear device 1502. In some cases, increasing the distance between acoustic transducers 1520 of the microphone array may improve the accuracy of beamforming performed via the microphone array. For example, if a sound is detected by acoustic transducers 1520(C) and 1520(D) and the distance between acoustic transducers 1520(C) and 1520(D) is greater than, e.g., the distance between acoustic transducers 1520(D) and 1520(E), the determined source location of the detected sound may be more accurate than if the sound had been detected by acoustic transducers 1520(D) and 1520(E).

Controller 1525 of neckband 1505 may process information generated by the sensors on neckband 1505 and/or augmented-reality system 1500. For example, controller 1525 may process information from the microphone array that describes sounds detected by the microphone array. For each detected sound, controller 1525 may perform a direction-of-arrival (DOA) estimation to estimate a direction from which the detected sound arrived at the microphone array. As the microphone array detects sounds, controller 1525 may populate an audio data set with the information. In embodiments in which augmented-reality system 1500 includes an inertial measurement unit, controller 1525 may compute all inertial and spatial calculations from the IMU located on eyewear device 1502. A connector may convey information between augmented-reality system 1500 and neckband 1505 and between augmented-reality system 1500 and controller 1525. The information may be in the form of optical data, electrical data, wireless data, or any other transmittable data form. Moving the processing of information generated by augmented-reality system 1500 to neckband 1505 may reduce weight and heat in eyewear device 1502, making it more comfortable to the user.

Power source 1535 in neckband 1505 may provide power to eyewear device 1502 and/or to neckband 1505. Power source 1535 may include, without limitation, lithium ion batteries, lithium-polymer batteries, primary lithium batteries, alkaline batteries, or any other form of power storage. In some cases, power source 1535 may be a wired power source. Including power source 1535 on neckband 1505 instead of on eyewear device 1502 may help better distribute the weight and heat generated by power source 1535.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1600 in FIG. 16, that mostly or completely covers a user's field of view. Virtual-reality system 1600 may include a front rigid body 1602 and a band 1604 shaped to fit around a user's head. Virtual-reality system 1600 may also include output audio transducers 1606(A) and 1606(B). Furthermore, while not shown in FIG. 16, front rigid body 1602 may include one or more electronic elements, including one or more electronic displays, one or more inertial measurement units (IMUs), one or more tracking emitters or detectors, and/or any other suitable device or system for creating an artificial reality experience.

Artificial-reality systems may include a variety of types of visual feedback mechanisms. For example, display devices in augmented-reality system 1500 and/or virtual-reality system 1600 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. Artificial-reality systems may include a single display screen for both eyes or may provide a display screen for each eye, which may allow for additional flexibility for varifocal adjustments or for correcting a user's refractive error. Some artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some artificial-reality systems may include one or more projection systems. For example, display devices in augmented-reality system 1500 and/or virtual-reality system 1600 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

Artificial-reality systems may also include various types of computer vision components and subsystems. For example, augmented-reality system 1500 and/or virtual-reality system 1600 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

Artificial-reality systems may also include one or more input and/or output audio transducers. In the examples shown in FIG. 16, output audio transducers 1606(A) and 1606(B) may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

While not shown in FIG. 15, artificial-reality systems may include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a deformable membrane that comprises or includes an elastomer include embodiments where a deformable membrane consists essentially of an elastomer and embodiments where a deformable membrane consists of an elastomer.

What is claimed is:

1. A method for forming an optical element, the method comprising:
    providing a precursor to a mold, wherein the mold includes a deformable surface overlying a chamber, wherein an outer periphery of the deformable surface is supported by a frame that peripherally surrounds the chamber;
    shaping the deformable surface according to a surface profile by:
        adjusting a fluid pressure within the chamber to introduce a spherical geometry into the deformable surface; and
        driving a plurality of actuators that are configured to introduce a cylindrical deformation into the deformable surface; and
    solidifying the precursor while the deformable surface is shaped according to the surface profile to form the optical element.

2. The method of claim 1, wherein the precursor comprises an optically transparent resin, amorphous polymer, polymer solution, or low melting temperature glass.

3. The method of claim 2, wherein solidifying the precursor comprises exposing the precursor to electromagnetic radiation.

4. The method of claim 1, wherein the deformable surface comprises a transparent material selected from the group consisting of a polymer, a glass, a ceramic, and sapphire.

5. The method of claim 1, wherein the plurality of actuators comprise bladders.

6. The method of claim 1, wherein adjusting the fluid pressure introduces the spherical geometry by introducing a axisymmetric deflection of the deformable surface and driving the plurality of actuators introduces the cylindrical deformation by introducing a non-axisymmetric deflection of the deformable surface.

7. The method of claim 6, further comprising controlling the axisymmetric deflection and the non-axisymmetric deflection in a manner that decouples the axisymmetric deflection from the non-axisymmetric deflection.

8. The method of claim 1, wherein solidifying the precursor comprises driving a plurality of individually controlled heat sources to different power levels or driving a plurality of individually controlled ultraviolet light sources to different emission levels.

9. The method of claim 1, further comprising forming a release layer or an antireflective coating over the deformable surface prior to providing the precursor to the mold.

10. The method of claim 1, further comprising:
    capturing an image of the deformable surface while the precursor is disposed within the mold; and
    adjusting the fluid pressure within the chamber and/or adjusting one or more of the plurality of actuators in response to the image prior to solidifying the precursor.

11. The method of claim 10, wherein capturing the image includes:
    illuminating the deformable surface with illumination light that propagates through the precursor; and
    receiving, by an image sensor, the illumination light through a lenslet array subsequent to the illumination light reflecting off of or passing through the deformable surface.

12. The method of claim 1, further comprising removing the optical element from the mold by driving one or more of the plurality of actuators.

13. The method of claim 1, wherein the optical element comprises an ophthalmic lens.

14. The method of claim 1, further comprising forming a reflective coating over a surface of the optical element.

15. A casting assembly for forming an optical element, the casting assembly comprising:
    a deformable surface that is overlying a chamber and that is shaped by adjusting a fluid pressure to introduce a spherical geometry into the deformable surface;
    a frame that peripherally surrounds the chamber, wherein an outer periphery of the deformable surface is supported by the frame; and
    a plurality of actuators that are configured to introduce a cylindrical deformation into the deformable surface.

16. The casting assembly of claim 15, wherein the plurality of actuators comprise deformable bladders configured to exert a localized pressure along the periphery of the deformable surface.

17. A casting assembly for forming an optical element, the casting assembly comprising:
    a deformable surface shaped by adjusting a pressure overlying a fluid-filled chamber to introduce a spherical geometry into the deformable surface;
    a frame that peripherally surrounds the fluid-filled chamber, wherein an outer periphery of the deformable surface is supported by the frame; and
    a plurality of actuators that are configured to introduce a cylindrical deformation into the deformable surface.

18. The casting assembly of claim 17, wherein changes to pressure within the fluid-filled chamber and actuation of the plurality of actuators are independently controlled.

19. The method of claim 1, wherein adjusting the fluid pressure is performed independently from driving the plurality of actuators.

20. The casting assembly of claim 15, further comprising a closed-loop system that adjusts the fluid pressure of the chamber.

* * * * *